(12) United States Patent
Wilson et al.

(10) Patent No.: US 9,043,278 B1
(45) Date of Patent: *May 26, 2015

(54) SYSTEM AND METHOD FOR THE MERGING OF DATABASES

(71) Applicant: Bertec Corporation, Columbus, OH (US)

(72) Inventors: Todd Christopher Wilson, Columbus, OH (US); Necip Berme, Worthington, OH (US)

(73) Assignee: Bertec Corporation, Columbus, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/252,001

(22) Filed: Apr. 14, 2014

Related U.S. Application Data

(63) Continuation-in-part of application No. 13/775,159, filed on Feb. 23, 2013, now Pat. No. 8,700,569, which is a continuation-in-part of application No. 13/467,472, filed on May 9, 2012, now Pat. No. 8,543,540.

(51) Int. Cl.
G06F 17/30 (2006.01)

(52) U.S. Cl.
CPC ............................. *G06F 17/30575* (2013.01)

(58) Field of Classification Search
None
See application file for complete search history.

(56) References Cited

U.S. PATENT DOCUMENTS

| 4,631,673 | A | 12/1986 | Haas et al. |
|---|---|---|---|
| 5,628,004 | A | 5/1997 | Gormley et al. |
| 5,721,909 | A | 2/1998 | Oulid-Aissa et al. |
| 5,806,074 | A | 9/1998 | Souder et al. |
| 5,862,327 | A | 1/1999 | Kwang et al. |
| 5,870,765 | A | 2/1999 | Bauer et al. |
| 5,873,096 | A | 2/1999 | Lim et al. |

(Continued)

FOREIGN PATENT DOCUMENTS

| CA | 2375260 A1 | 9/2000 |
|---|---|---|
| EP | 1024441 A2 | 8/2000 |

(Continued)

OTHER PUBLICATIONS

First office action on the merits (Non-Final Rejection) in U.S. Appl. No. 13/467,472, mailed on Aug. 14, 2012.

(Continued)

*Primary Examiner* — Richard Bowen
(74) *Attorney, Agent, or Firm* — The Law Office of Patrick F. O'Reilly, III, LLC

(57) ABSTRACT

A system and method for merging a first database with a second database (one-way merge), and a system and method for merging two databases with one another (two-way merge) is described herein. During the one-way merge, new or updated records are transferred from a copy of a client database to a server database after it is determined that the server database either does not contain one or more records in the copy of the client database or contains an older version of one or more records in the copy of the client database. During the two-way merge, new or updated records are transferred between a client database and a server database after it is determined that either the client database or the server database does not contain one or more records in the other database or contains an older version of one or more records in the other database.

17 Claims, 22 Drawing Sheets

(Two-Way Merge)

(56) References Cited

U.S. PATENT DOCUMENTS

| | | | |
|---|---|---|---|
| 5,899,998 A | 5/1999 | McGauley et al. |
| 5,924,094 A | 7/1999 | Sutter |
| 5,937,414 A | 8/1999 | Souder et al. |
| 5,956,719 A | 9/1999 | Kudo et al. |
| 6,016,478 A | 1/2000 | Zhang et al. |
| 6,038,488 A | 3/2000 | Barnes et al. |
| 6,113,237 A | 9/2000 | Ober et al. |
| 6,125,369 A | 9/2000 | Wu et al. |
| 6,152,564 A | 11/2000 | Ober et al. |
| 6,223,187 B1 | 4/2001 | Boothby et al. |
| 6,295,541 B1 | 9/2001 | Bodnar et al. |
| 6,295,878 B1 | 10/2001 | Berme |
| 6,354,155 B1 | 3/2002 | Berme |
| 6,389,883 B1 | 5/2002 | Berme et al. |
| 6,446,092 B1 | 9/2002 | Sutter |
| 6,460,051 B1 | 10/2002 | LaRue et al. |
| 6,470,329 B1 | 10/2002 | Livschitz |
| 6,502,135 B1 * | 12/2002 | Munger et al. ............... 709/225 |
| 6,516,327 B1 | 2/2003 | Zondervan et al. |
| 6,535,892 B1 | 3/2003 | LaRue et al. |
| 6,539,381 B1 | 3/2003 | Prasad et al. |
| 6,611,849 B1 * | 8/2003 | Raff et al. ............................. 1/1 |
| 6,633,924 B1 | 10/2003 | Wu et al. |
| 6,718,348 B1 | 4/2004 | Novak et al. |
| 6,915,312 B2 | 7/2005 | Bodnar et al. |
| 6,936,016 B2 | 8/2005 | Berme et al. |
| 7,222,141 B2 | 5/2007 | Zondervan et al. |
| 7,487,186 B2 | 2/2009 | Shimshoni |
| 7,490,112 B1 | 2/2009 | Suresh et al. |
| 7,606,881 B2 | 10/2009 | Chasman et al. |
| 7,617,540 B2 | 11/2009 | Kim et al. |
| 7,953,794 B2 | 5/2011 | Clarke et al. |
| 7,966,287 B2 | 6/2011 | Brown |
| 8,181,541 B2 | 5/2012 | Berme |
| 8,315,822 B2 | 11/2012 | Berme et al. |
| 8,315,823 B2 | 11/2012 | Berme et al. |
| 8,543,540 B1 | 9/2013 | Wilson et al. |
| 8,700,569 B1 | 4/2014 | Wilson et al. |
| 2003/0216656 A1 | 11/2003 | Berme et al. |
| 2005/0099963 A1 | 5/2005 | Multer et al. |
| 2005/0149582 A1 | 7/2005 | Wissmann et al. |
| 2005/0184857 A1 | 8/2005 | Roatis et al. |
| 2006/0161516 A1 | 7/2006 | Clarke et al. |
| 2007/0011319 A1 * | 1/2007 | McClure et al. ............... 709/224 |
| 2007/0282848 A1 | 12/2007 | Kiilerich et al. |
| 2008/0032739 A1 * | 2/2008 | Hoodbhoy et al. ........ 455/556.2 |
| 2008/0098042 A1 | 4/2008 | Tian et al. |
| 2008/0120270 A1 | 5/2008 | Lamberts |
| 2008/0144624 A1 | 6/2008 | Marcondes et al. |
| 2008/0163743 A1 | 7/2008 | Freedman |
| 2008/0228110 A1 | 9/2008 | Berme |
| 2009/0287746 A1 | 11/2009 | Brown |
| 2010/0174807 A1 * | 7/2010 | Lyman et al. ................. 709/221 |
| 2010/0274587 A1 | 10/2010 | Gamboa et al. |
| 2011/0277562 A1 | 11/2011 | Berme |
| 2011/0289100 A1 | 11/2011 | Madhavarapu et al. |
| 2012/0030173 A1 | 2/2012 | Freedman |
| 2012/0209808 A1 | 8/2012 | Tien et al. |
| 2012/0239704 A1 | 9/2012 | O'Farrell et al. |
| 2012/0266648 A1 | 10/2012 | Berme et al. |
| 2012/0271565 A1 | 10/2012 | Berme et al. |
| 2013/0124601 A1 * | 5/2013 | Goldman ...................... 709/203 |

FOREIGN PATENT DOCUMENTS

| | | |
|---|---|---|
| EP | 1131757 B1 | 5/2005 |
| JP | 2000235513 A | 8/2000 |
| JP | 2008537255 A | 9/2008 |
| WO | 2008058927 A2 | 5/2008 |

OTHER PUBLICATIONS

Second office action on the merits (Final Rejection) in U.S. Appl. No. 13/467,472, mailed on Nov. 5, 2012.

Third office action on the merits (Non-Final Rejection) in U.S. Appl. No. 13/467,472, mailed on Mar. 22, 2013.

Notice of Allowance in U.S. Appl. No. 13/467,472, mailed on Aug. 16, 2013.

First office action on the merits (Non-Final Rejection) in U.S. Appl. No. 13/775,159, mailed on Jul. 3, 2013.

Notice of Allowance in U.S. Appl. No. 13/775,159, mailed on Nov. 22, 2013.

* cited by examiner (One-Way Merge)

(Two-Way Merge)

SYSTEM AND METHOD FOR THE MERGING OF DATABASES

CROSS-REFERENCE TO RELATED APPLICATIONS

This patent application is a continuation-in-part application, which is co-pending with, and claims priority from, U.S. Non-Provisional patent application Ser. No. 13/775,159, entitled "System and Method for the Merging of Databases", filed on Feb. 23, 2013, which is a continuation-in-part application of U.S. Non-Provisional patent application Ser. No. 13/467,472, entitled "System and Method for the Merging of Databases", filed on May 9, 2012, the disclosures of each of which are hereby incorporated by reference as if set forth in their entirety herein.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.
INCORPORATION BY REFERENCE OF MATERIAL SUBMITTED ON A COMPACT DISK
Not Applicable.

BACKGROUND OF THE INVENTION

1. Field of the Invention

The invention generally relates to a system and method for the merging of databases. More particularly, the invention relates to a system and method for merging a first database with a second database (one-way merge), and a system and method for merging two databases with one another (two-way merge).

2. Background

Presently, there are many businesses that utilize mixed office computing systems. In such a system, for example, some of the computers may comprise in-the-field laptops with no network connectivity, whereas other computers may include desktop-based computing systems. Because some of the individual computers in the mixed office system are not connected to one another, and also are not storing all files on a common server (e.g., in-the-field laptops with no network connectivity), there is a great potential for the creation of many disparate copies of the same database. While many of these businesses with disparate copies of the same database do not need real-time data updates, they often desire end-of-the-day database merging wherein the database content of a first computer (e.g., in-the-field laptop with no network connectivity) is merged with the database content of a second computer (e.g., desktop computer).

Existing database systems do not adequately accommodate this particular mixed office distributed model. Some of the conventional database systems are either standalone with no connectivity at all, whereas other conventional database systems require "always-on" network connectivity via a virtual private network (VPN). As such, the traditional database systems do not permit the merging of disparate copies of the same database between computers with intermittent connectivity. Also, typical database merge protocols are not easily scalable for a large number of workstations being connected within a network. In addition, conventional database merge protocols are not easily resumable when a network connection is temporarily lost in a network having suboptimal connectivity. Also, many conventional database merge protocols deleteriously interfere with the primary applications that the computer is executing in the foreground of the computing environment.

What is needed, therefore, is a system and method for the merging of databases that offers greater flexibility in connectivity, wherein individual computers in the system can be connected on an ad hoc basis to merge the database results when needed, with no requirements for the availability of a network connection. Also, a system and method for the merging of databases is needed that can be easily resumed in the event that a network connection is temporarily disrupted. Moreover, a system and method for the merging of databases is needed that can utilized in a disconnected network, wherein a copy of the database can be made on removable media and given, or shipped, to a different system and merged in that fashion. Furthermore, a need exists for a system and method for the merging of databases that can be effectively utilized without compromising the security of a secure computing network, and can be easily scaled to accommodate various numbers of workstations connected in a network. In addition, a system and method for the merging of databases is needed that can operate effectively in the background of the computing environment without interfering with the primary applications that the computer is executing in the foreground of the computing environment.

BRIEF SUMMARY OF EMBODIMENTS OF THE INVENTION

Accordingly, the present invention is directed to a system and method for the merging of databases that substantially obviates one or more problems resulting from the limitations and deficiencies of the related art.

In accordance with one or more embodiments of the present invention, there is provided a system for merging two databases with one another, the system including first and second computing devices having respective first and second databases stored thereon, the first and second databases each comprising one or more records, each of the one or more records having a unique identifier and timestamp associated therewith, the first and second computing devices being operatively connected to one another by a network connection. The first computing device being specially programmed to: (i) generate a first filtered listing of the one or more unique identifiers and timestamps associated with the one or more records in the first database by using a timestamp filter, the timestamp filter comprising a last-seen timestamp value which is indicative of the last time the first computing device communicated with the second computing device, wherein records having timestamps older than the last-seen timestamp value are not included in the first filtered listing; and (ii) send the first filtered listing of one or more unique identifiers and timestamps from the first computing device to the second computing device. The second computing device being specially programmed to: (i) generate a second filtered listing of one or more unique identifiers and timestamps associated with the one or more records in the second database using the last-seen timestamp value sent to the second computing device from the first computing device; (ii) compare the first filtered listing of the one or more unique identifiers and timestamps associated with the one or more records in the first database to the second filtered listing of one or more unique identifiers and timestamps associated with the one or more records in the second database; (iii) determine whether each of the one or more unique identifiers in the first filtered listing exists in the second filtered listing, and whether each of the one or more unique identifiers in the second filtered listing exists in the first filtered listing; (iv) when it is determined that one or more unique identifiers in the first filtered listing do not exist in the second filtered listing, add one or more records associated with the one or more unique identifiers that do not exist to a record request list; (v) when it is determined that one or more unique identifiers in the first filtered listing also exist in the second filtered listing, further determine, a most recent version of one or more records associated with the one or more unique identifiers existing in both listings by comparing one or more timestamps in the first filtered listing to one or more timestamps of one or more corresponding records in the second filtered listing; (vi) when it is determined that one or more records in the first filtered listing have a more recent timestamp than one or more corresponding records in the second filtered listing with matching unique identifiers, adding the one or more records having more recent timestamps to the record request list; (vii) when it is determined that one or more records in the second filtered listing have a more recent timestamp than one or more corresponding records in the first filtered listing with matching unique identifiers, add the one or more records having more recent timestamps to a record send list; (viii) when it is determined that one or more unique identifiers in the second filtered listing do not exist in the first filtered listing, add one or more records associated with the one or more unique identifiers that do not exist to the record send list; (ix) transfer the record request list to the first computing device; and (x) copy the one or more records on the record send list into a second export queue of the second computing device. The first computing device being further specially programmed to copy the one or more records on the record request list into a first export queue of the first computing device.

In a further embodiment of the present invention, the first computing device is further specially programmed to, prior to generating the first filtered listing, determine whether the second computing device is already syncing with the first computing device.

In yet a further embodiment, the first computing device is further specially programmed to: (a) prior to determining whether the second computing device is already syncing with the first computing device, send an initial command to the second computing device; and (b) when the second computing device responds to the initial command sent by the first computing device, receive at least the following: (i) a unique identifier of the second computing device, (ii) a maximum data block size that the second computing device is capable of receiving as one payload, and (iii) a last time the second computing device communicated with the first computing device.

In still a further embodiment, the first computing device is further specially programmed to, after sending the initial command to the second computing device, determine whether the second computing device responds to the initial command within a predetermined timeframe.

In yet a further embodiment, the first computing device is further specially programmed to perform a user datagram protocol process in order to determine a list of one or more networked computing devices that are capable of being synced with the first computing device.

In still a further embodiment, the last-seen timestamp value of the timestamp filter is expressed in the form of a Julian date.

In yet a further embodiment, the first computing device is a client computing device and the second computing device is a server computing device.

In accordance with one or more embodiments of the present invention, there is provided a method for merging two databases with one another, which includes the steps of: (i) providing first and second computing devices having respective first and second databases stored thereon, the first and second databases each comprising one or more records, each of the one or more records having a unique identifier and timestamp associated therewith; (ii) connecting the first computing device with the second computing device by utilizing a network connection; (iii) generating, by using the first computing device, a first filtered listing of the one or more unique identifiers and timestamps associated with the one or more records in the first database by using a timestamp filter, the timestamp filter comprising a last-seen timestamp value which is indicative of the last time the first computing device communicated with the second computing device, wherein records having timestamps older than the last-seen timestamp value are not included in the first filtered listing; (iv) sending the first filtered listing of one or more unique identifiers and timestamps from the first computing device to the second computing device; (v) comparing, by using the second computing device, the first filtered listing of the one or more unique identifiers and timestamps associated with the one or more records in the first database to a second filtered listing of one or more unique identifiers and timestamps associated with the one or more records in the second database, the second filtered listing being generated using the last-seen timestamp value sent to the second computing device from the first computing device; (vi) determining, by using the second computing device, whether each of the one or more unique identifiers in the first filtered listing exists in the second filtered listing, and whether each of the one or more unique identifiers in the second filtered listing exists in the first filtered listing; (vii) when it is determined that one or more unique identifiers in the first filtered listing do not exist in the second filtered listing, adding one or more records associated with the one or more unique identifiers that do not exist to a record request list; (viii) when it is determined that one or more unique identifiers in the first filtered listing also exist in the second filtered listing, further determining, by using the second computing device, a most recent version of one or more records associated with the one or more unique identifiers existing in both listings by comparing one or more timestamps in the first filtered listing to one or more timestamps of one or more corresponding records in the second filtered listing; (ix) when it is determined that one or more records in the first filtered listing have a more recent timestamp than one or more corresponding records in the second filtered listing with matching unique identifiers, adding the one or more records having more recent timestamps to the record request list; (x) when it is determined that one or more records in the second filtered listing have a more recent timestamp than one or more corresponding records in the first filtered listing with matching unique identifiers, adding the one or more records having more recent timestamps to a record send list; (xi) when it is determined that one or more unique identifiers in the second filtered listing do not exist in the first filtered listing, adding one or more records associated with the one or more unique identifiers that do not exist to the record send list; (xii) transferring the record request list from the second computing device to the first computing device; (xiii) copying, using the second computing device, the one or more records on the record send list into a second export queue of the second computing device; and (xiv) copying, using the first computing device, the one or more records on the record request list into a first export queue of the first computing device.

In a further embodiment of the present invention, the method further comprises the steps of: (i) after each of the one or more records in the first export queue is sent from the first computing device to the second computing device, determining, by using the second computing device, whether each of the one or more records sent from the first computing device exists in the second database by comparing one or more unique identifiers of the one or more records sent from the first computing device to one or more unique identifiers of the one or more records in the second database; (ii) when it is determined that one or more records sent from the first computing device do not exist in the second database, insert the one or more records associated with the one or more unique identifiers that do not exist into the second database; (iii) when it is determined that the one or more records sent from the first computing device also exist in the second database, further determine a most recent version of the one or more records also existing in the second database by comparing one or more timestamps of the one or more records sent from the first computing device to one or more timestamps of one or more corresponding records in the second database; and (iv) when it is determined that the one or more records sent from the first computing device have a more recent timestamp than one or more corresponding records in the second database with matching unique identifiers, update the one or more corresponding records in the second database (i.e., replace the one or more corresponding records in the second database with the newer records).

In yet a further embodiment, the method further comprises the steps of: (i) after each of the one or more records in the second export queue is sent from the second computing device to the first computing device, determining, by using the first computing device, whether each of the one or more records sent from the second computing device exists in the first database by comparing one or more unique identifiers of the one or more records sent from the second computing device to one or more unique identifiers of the one or more records in the first database; (ii) when it is determined that one or more records sent from the second computing device do not exist in the first database, insert the one or more records associated with the one or more unique identifiers that do not exist into the first database; (iii) when it is determined that the one or more records sent from the second computing device also exist in the first database, further determine a most recent version of the one or more records also existing in the first database by comparing one or more timestamps of the one or more records sent from the second computing device to one or more timestamps of one or more corresponding records in the first database; and (iv) when it is determined that the one or more records sent from the second computing device have a more recent timestamp than one or more corresponding records in the first database with matching unique identifiers, update the one or more corresponding records in the first database (i.e., replace the one or more corresponding records in the first database with the newer records).

In still a further embodiment, the method further comprises the step of, when the first computing device has never previously communicated with the second computing device, setting the last-seen timestamp value equal to zero by using the first computing device.

In yet a further embodiment, the first computing device is a client computing device and the second computing device is a server computing device.

In still a further embodiment, the method for merging two databases with one another is an asynchronous process that is capable of operating on the first and second computing devices while other applications are being simultaneously executed by the first and second computing devices.

In yet a further embodiment, the method for merging two databases with one another is a resumable process that is capable of being restarted at any point in the process if an interruption in the network connection between the first and second computing devices occurs.

It is to be understood that the foregoing summary and the following detailed description of the present invention are merely exemplary and explanatory in nature. As such, the foregoing summary and the following detailed description of the invention should not be construed to limit the scope of the appended claims in any sense.

BRIEF DESCRIPTION OF THE SEVERAL VIEWS OF THE DRAWINGS

The invention will now be described, by way of example, with reference to the accompanying drawings, in which.

Throughout the figures, the same components/steps are always denoted using the same reference characters so that, as a general rule, they will only be described once.

DETAILED DESCRIPTION OF EMBODIMENTS OF THE INVENTION

The present invention is described herein, in an exemplary manner, with reference to computer system architecture and flowcharts that illustrate exemplary processes carried out by the computer system. In a preferred embodiment, functional blocks of the flowchart illustrations can be implemented by computer system instructions. These computer program instructions may be loaded directly onto an internal data storage device of a computing device (e.g., a hard drive of a computer). Alternatively, these computer program instructions could be stored on a portable computer-readable medium (e.g., a flash drive, a floppy disk, a compact disk, etc.), and then subsequently loaded onto a computing device such that the instructions can be executed thereby. In other embodiments, these computer program instructions could be embodied in the hardware of the computing device, rather than in the software thereof. It is also possible for the computer program instructions to be embodied in a combination of both the hardware and the software. Also, as described herein, it is to be understood that, when a computer, a computing device, computing system, or a data processing system is said to perform particular steps or functions (e.g., to make a particular determination) in conjunction with the description of a flowchart or flowcharts, this is equivalent to reciting that the computer, computing device, computing system, or data processing system is configured and arranged to perform the particular steps or functions, or in other words, is specially programmed to carry out the particular steps or functions.

This description describes in general form the computer program(s) required to carry out one-way and two-way merging of databases. Any competent programmer in the field of information technology could develop a system using the description set forth herein.

For the sake of brevity, conventional computer system components, conventional data networking, and conventional software coding will not be described in detail herein. Also, it is to be understood that the connecting lines shown in the block diagram(s) included herein are intended to represent functional relationships and/or operational couplings between the various components. Similarly, connecting lines are also used between the elements of the flowcharts in order to illustrate the functional relationships therebetween. In addition to that which is explicitly depicted, it is to be understood that many alternative or additional functional relationships and/or physical connections may be incorporated in a practical application of the system.

1. Exemplary System

Figure 1:
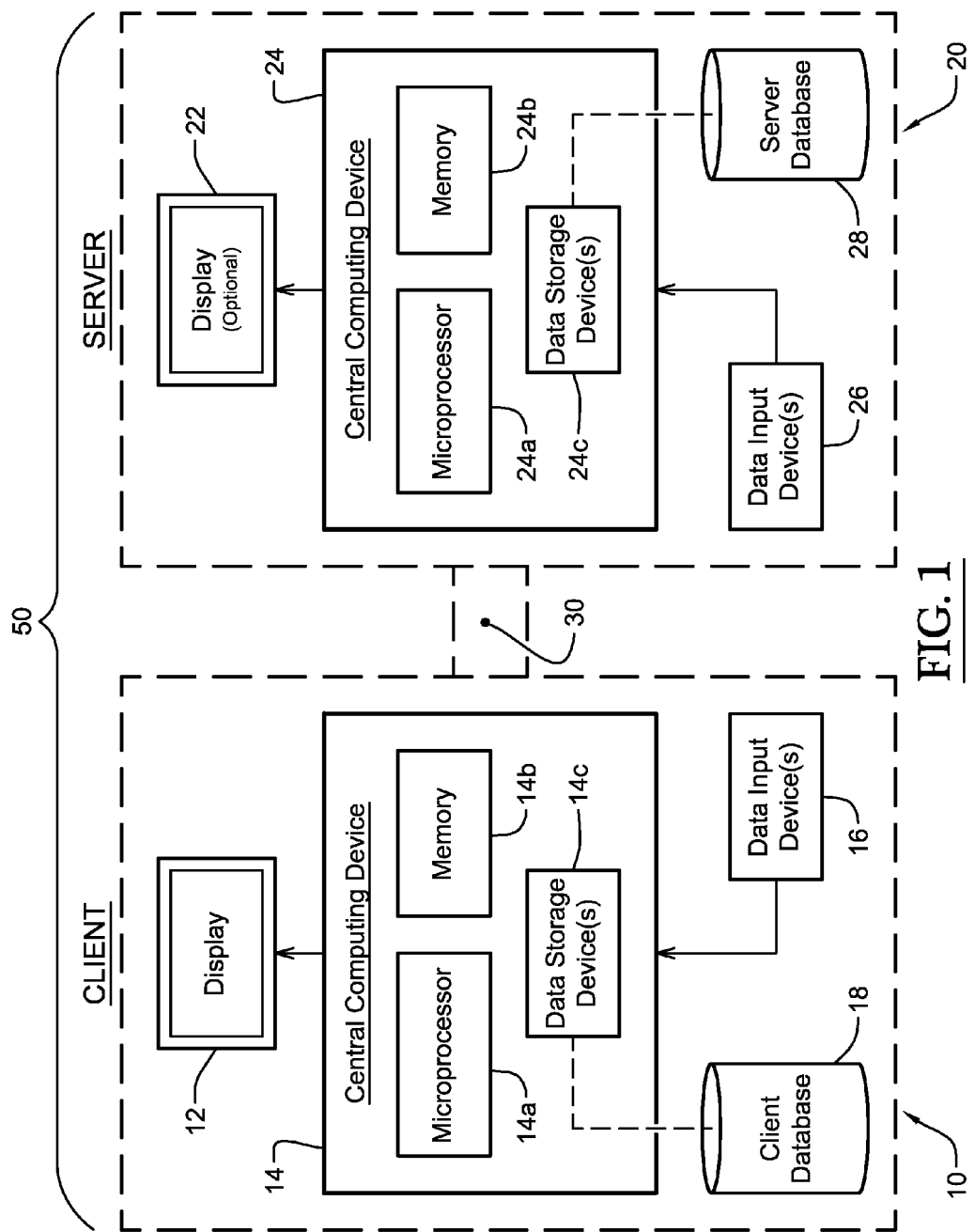
FIG. 1 is a block diagram of an exemplary system for carrying out the merging of databases, according to an embodiment of the invention.

FIG. 1 is a schematic representation of an exemplary computer system 50 for carrying out the merging of databases, according to an embodiment of the invention. The computer system 50 generally comprises a client computing device 10 and a server computing device 20. In some embodiments of the invention, the client computing device 10 and the server computing device 20 are operatively connected to one another via a network connection 30. Preferably, the network connection 30 is an encrypted network connection so that data can be securely transferred between the client computing device 10 and the server computing device 20. The network connection 30 between the computing devices 10, 20 can be a conventional hard-wired connection (e.g., utilizing an Ethernet cable or any other type of suitable data transmission cable), or alternatively, can utilize wireless data transmission technology (e.g., a wireless local area network, commonly referred to as Wi-Fi technology).

However, it is to be understood that a network connection 30 between the computing devices 10, 20 is not required for all embodiments of the invention. In particular, while a network connection 30 is needed for the two-way merge procedure, it is not required for the one-way merge procedure. Rather, in order to carry out the one-way merge procedure hereinafter described, a user can simply make a backup copy of the client database 18 on a form of electronic media (e.g., a flash drive or a compact disk) or a shared device by utilizing the client computing device 10. Then, the user can subsequently make the backup copy of the client database 18 residing on the electronic media or shared device available to the server computing device 20 prior to carrying out the one-way merge procedure (e.g., by inserting the flash drive or the compact disk (CD) into the server computing device 20, or by operatively coupling the shared device to the server computing device 20).

Referring again to FIG. 1, it can be seen that the client computing device 10 includes a central computing device 14 for collecting, storing, and processing data, as well as a plurality of peripheral devices 12, 16 operatively connected thereto. The peripheral devices preferably include a graphical user interface or display 12 (e.g., a monitor) and a plurality of data input devices 16, such as a keyboard and a mouse. As shown in FIG. 1, the central computing device 14 of the client computing device 10 comprises a microprocessor 14a for processing data, memory 14b (e.g., random access memory or RAM) for storing data during the processing thereof, and data storage device(s) 14c, such as one or more hard drives, compact disk drives, floppy disk drives, flash drives, or any combination thereof. The client database 18 is stored on a medium of the one or more data storage device(s) 14c of the client computing device 10, such as on the medium of the hard drive of the client computing device 10. In some embodiments, the client computing device 10 can be in the form of a laptop computer, while in other embodiments, the client computing device 10 can be embodied as a desktop computer. While, still in other embodiments, the client computing device 10 may be in the form of a palmtop computing device (i.e., a PDA), a tablet computing device, or any other suitable computing device.

Similarly, as further illustrated in FIG. 1, the server computing device 20 includes a central computing device 24 for collecting, storing, and processing data, as well as a plurality of peripheral devices 22, 26 operatively connected thereto. As described above for the client computing device 10, the peripheral devices could include a graphical user interface or display 22 (e.g., a monitor) and a plurality of data input devices 26, such as a keyboard and a mouse. Moreover, like the client computing device 10, the central computing device 24 of the server computing device 20 comprises a microprocessor 24a for processing data, memory 24b (e.g., random access memory or RAM) for storing data during the processing thereof, and data storage device(s) 24c, such as one or more hard drives, compact disk drives, floppy disk drives, flash drives, or any combination thereof. The server database 28 is stored on a medium of the one or more data storage device(s) 24c of the server computing device 20, such as on the medium of the hard drive of the server computing device 20. In some embodiments, the server computing device 20 can be in the form of a desktop computer or a mainframe computer, while in other embodiments, the server computing device 20 can be embodied as a laptop computer. While, still in other embodiments, the server computing device 20 may be in the form of a palmtop computing device (i.e., a PDA), a tablet computing device, or any other suitable computing device.

In another embodiment, the server computing device 20 is in the form of a remote monitoring device that is operatively connected to the client computing device 10 by virtue of a web interface (i.e., a virtual machine). In such an embodiment, the server computing device 20 would not be required to have a display 22, and it could operate without user interaction. Alternatively, the server computing device 20 could provide monitoring and control by means of some user interface (e.g., desktop, remote, web, etc.).

In a preferred embodiment of the invention, one or both of the client database 18 and the server database 28 are encrypted so as to protect the secrecy of the data stored therein. Thus, confidential or proprietary data can be safely stored in the databases 18, 28 without the fear of interception by an unauthorized third party. Also, the database file itself (i.e., containing the database 18 or 28) is preferably a self-contained file that can be directly read, copied, and manipulated by the operating system of the computing device 10, 20. In addition, preferably the self-contained database file is capable of being encrypted at the file-system level.

2. One-Way Merge Procedure

Figure 2:
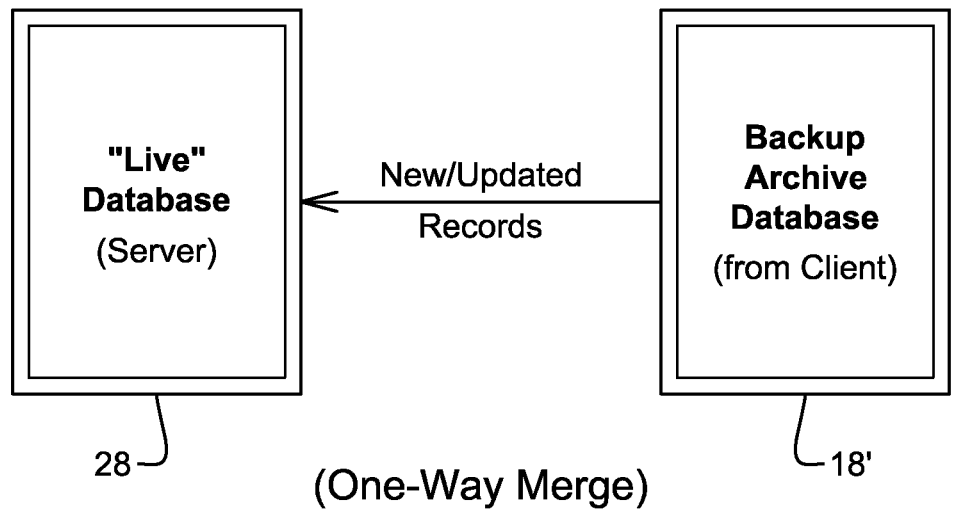
FIG. 2 is a schematic diagram illustrating the merging of a first database with a second database (i.e., a one-way merge), according to an embodiment of the invention.

In FIG. 2, the merging of a first database with a second database (i.e., a one-way merge) is schematically illustrated. In general, during an exemplary one-way merge procedure, new or updated records are transferred from a backup archive database 18' (i.e., a copy of the client database 18) to a "live" database 28 (i.e., the server database) after it is determined that the "live" database 28 either does not contain one or more records in the backup archive database 18' or contains an older version of one or more records in the backup archive database 18'. The records transferred from the backup archive database 18' to the "live" database 28 can comprise various forms of data. For example, the records could include any of the following: (i) operator data for an individual conducting subject testing, (ii) anatomical data for a test subject, (iii) numerical data acquired during the testing of a subject, or (iv) a graphical depiction of a test subject. However, one of ordinary skill in the art will readily appreciate that these are merely examples of the type of content which the records may contain. The claimed invention encompasses all possible forms of record content.

Figure 4:
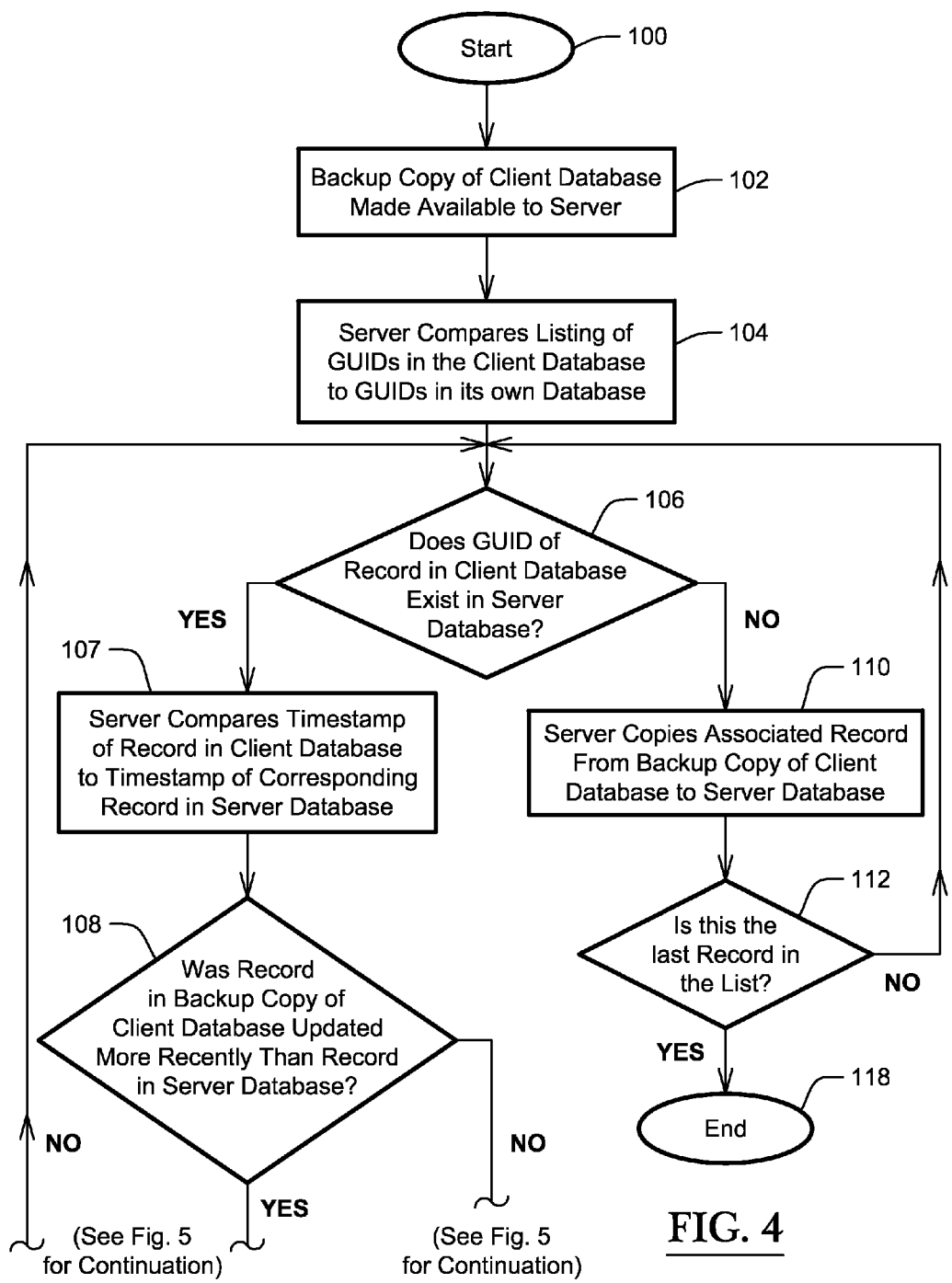
FIG. 4 is a partial flowchart illustrating a one-way merge procedure carried out by the system of FIG. 1, according to an embodiment of the invention.
Figure 5:
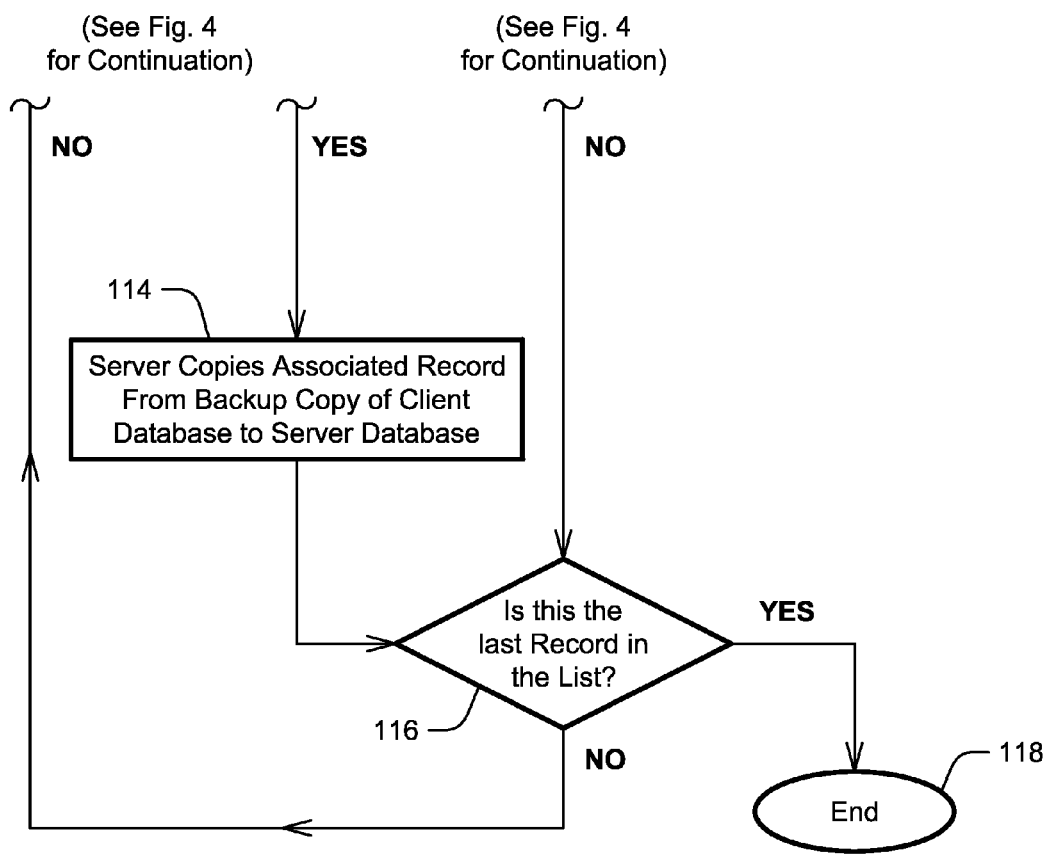
FIG. 5 is a continuation of the flowchart of FIG. 4, which illustrates additional steps of the one-way merge procedure, according to an embodiment of the invention.

In accordance with an embodiment of the invention, a flowchart illustrating a one-way merge procedure carried out by the computer system 50 of FIG. 1 is set forth in FIGS. 4 and 5. Referring initially to FIG. 4, the procedure commences at 100, and in step 102, a backup copy of the client database 18' is made available to the server computing device 20 ("server"). In a preferred embodiment, a data storage/transfer device (e.g., a floppy disk drive, a compact disk (CD) drive, or flash drive) of the client computing device 10 ("client") is utilized for making a backup copy of the entire client database 18 (i.e., not just a portion or subset of the database) by storing the backup copy of the client database 18' on a form of electronic media or a shared device. Then, the electronic media or the shared device is used to make the backup copy of the client database 18' available to the server computing device 20, and the client database 18' is attached to the server database 28 as a supplementary database thereto (e.g., with the name "OtherDatabase"). After which, in step 104, the server compares the listing of globally unique identifiers (GUIDs) in the copy of the client database 18' to the listing of globally unique identifiers (GUIDs) in its own database (i.e., server database 28).

In step 106 (i.e., decision block 106), the server initially determines whether a GUID identifying a particular record in the copy of client database 18' exists in the server database 28. When it is determined that a GUID identifying a particular record in the copy of the client database 18' does not exist in the server database 28, the server copies the associated record from the backup copy of the client database 18' to the server database 28 (step 110 in FIG. 4). After which, in step 112, the server determines if the copied record is the last record in the copy of the client database 18'. If the copied record is the last record in the client database 18, the process ends at step 118. Otherwise, the determination in step 106 is performed for the next record in the listing of records for the client database 18.

When it is determined that a GUID identifying a particular record in the copy of the client database 18' also exists in the server database 28, the server further compares, in step 107, the timestamp of the record in the backup copy of the client database 18' to the timestamp of the corresponding record in the server database 28. Then, in step 108, by means of the timestamp comparison, the server determines whether the record in the backup copy of the client database 18' was updated more recently than the corresponding record in the server database 28. The version of the record having the most recent timestamp associated therewith is deemed to be the record that was most recently updated. In this peer-to-peer system, the timestamps associated with the client database 18' are assigned by the client computing device 10, whereas the timestamps associated with the server database 28 are assigned by the server computing device 20. When it is determined that the version of the record in the backup copy of the client database 18' has a more recent timestamp, and thus was updated more recently, than the version of the record in the server database 28, the server copies the associated record from the backup copy of the client database 18' to the server database 28 (step 114 in FIG. 5). After which, in step 116 of FIG. 5, the server determines if the copied record is the last record in the copy of the client database 18'. If the copied record is the last record in the client database 18, the process ends at step 118. Otherwise, the initial determination in step 106 is performed for the next record in the listing of records for the client database 18.

On the other hand, when it is determined that the version of the record in the backup copy of the client database 18' has an older timestamp as compared to the version of the record in the server database 28, the process proceeds directly to step 116 in FIG. 5, wherein the server determines if that particular record is the last record in the copy of the client database 18'. If it is the last record, the process ends at step 118. If not, the initial determination in step 106 is carried out for the next record in the listing of records for the client database 18. The aforedescribed process is performed by the server until each of the records in the copy of the client database 18' is evaluated.

Advantageously, as described above, the timestamps of the records having common unique identifiers are compared only once during the one-way merge procedure (i.e., in step 107) so as to result in an efficient and streamlined process. In other words, only one comparison of timestamps for a particular pair of records having matching unique identifiers (i.e., GUIDs) is performed during the one-way merge process.

In a preferred embodiment, the globally unique identifiers (GUIDs) utilized for the identification of the records in the client database 18 and the server database 28 comprise a 32-character hexadecimal string, such as {52FC4040-7BCH-8096-C4MM-09001L40407E}, and are stored by the computing devices 10, 20 as 128-bit integers. The hexadecimal digits comprising each GUID can be separated into five groups, each group being separated from adjacent group(s) by means of dashes. In one embodiment, the first group includes eight (8) hexadecimal digits, the second, third, and fourth groups each include four (4) hexadecimal digits, while the fifth group includes twelve (12) hexadecimal digits. Although, one of ordinary skill in the art will appreciate that the hexadecimal string comprising each GUID can utilize a different overall number of characters, different groupings of characters, or a different means of separating the various groups.

In one embodiment of the invention, the globally unique identifiers (GUIDs) can be randomly selected, and may comprise mathematically random numbers or mathematically pseudo-random numbers. While, in another embodiment of the invention, the values for the GUIDs can be based, at least in part, on the content of the fields in the records they are used to designate. For example, the GUIDs could comprise heuristic values based upon a portion of the content in the fields of the records that they represent.

In one exemplary embodiment, records in the database (e.g., 18 or 20) that are associated with the operator (or user) of the system do not get random GUID values for the record identifiers. Rather, the GUIDs used to identify the operator (or user) records are generated based on common names (e.g., Admin, Demo, etc.) that use predefined GUID values, or else are generated by a mathematical checksum computation of the operator name implemented, for example, by the following lines of code:

if (operatorName="Admin")
        return DefaultAdminGUID;
    else if (operatorName="Demo")
        return DefaultDemoGUID;
    else
        return checksum(operatorName);

In the above example, if the operator name is something other than "Admin" or "Demo", then a checksum will be generated by inputting the operator name (e.g., Todd) into a checksum function, thereby producing a numerical checksum value (e.g., 15826340) therefrom. As such, in certain cases, where using a randomly generated GUID value would be incorrect, the GUID value is synthesized from specific record field values (e.g., from the operator name field in the record) so that exact duplicate record data independently created on multiple computing devices will appear to be the same record. In the above example, it is undesirable for the same operator data record on two different computing systems to be assigned different GUID values.

In a preferred embodiment of the invention, the timestamps utilized for indicating the date and time when the records in the client database 18 and the server database 28 were updated are expressed in the form of Julian dates. A Julian date is comprised of the following two parts: (i) the Julian day number, which is the integer part of the Julian date; and (ii) the decimal parts of a Julian date, which are used to denote the time on a particular day. The Julian day number is the number of days that have passed since Jan. 1, 4713 BC (JDN=0) in accordance with the proleptic Julian calendar. The decimal parts of a Julian date are defined as follows:

0.1=2.4 hours, or alternatively 144 minutes or 8640 seconds
    0.01=0.24 hours, or alternatively 14.4 minutes or 864 seconds
    0.001=0.024 hours, or alternatively 1.44 minutes or 86.4 seconds
    0.0001=0.0024 hours, or alternatively 0.144 minutes or 8.64 seconds
    0.00001=0.00024 hours, or alternatively 0.0144 minutes or 0.864 seconds.

For example, a Julian date equal to "2455896.10596" corresponds to Wednesday, Nov. 30, 2011 at 14:32:34.9 UT, whereas a Julian date equal to "2455982.13360" corresponds to Friday, Feb. 24, 2012 at 15:12:23.0 UT (or UTC, is the acronym for coordinated universal time).

Advantageously, the utilization of Julian dates for the timestamps provides a consistent format between different locales (e.g., the American and European format is exactly the same). Moreover, the use of Julian dates and coordinated universal time eliminates the issues associated with differing time zones (e.g., it doesn't matter whether the client computing device 10 is located in Columbus, Ohio which is on Eastern Daylight Time (EDT), and the server computing device 20 is located in Los Angeles, Calif., which is on Pacific Daylight Time (PDT)).

In order to advantageously simplify and streamline the merge processes set forth herein, no conflicts check of any kind is performed in either the one-way merge procedure or the two-way merge procedure. As a result, the one-way and two-way merge processes described herein are carried out without checking any of the records residing in the databases being merged for conflicts (e.g., none of the records in the databases 18, 28 are checked for conflicts when a merge process is carried out thereon). Thus, no conflict detection is carried out in conjunction with the merge processes set forth herein, and the data in the records is not checked for conflicts. It is never determined in any of the merge processes described herein whether or not a conflict exists between two records having the same unique identifier (i.e., the same GUID). If a record is newer than the record it is replacing, then the older record simply gets replaced. Because no conflicts check is being performed in either the one-way merge procedure or the two-way merge procedure, these merge processes do not involve any type of conflicts resolution strategy.

In one or more embodiments of the invention, the computing device (e.g., the server computing device 20) is specially programmed to create a backup copy of the database on which the merge is being performed (e.g., the server database 28) before the one-way merge procedure is carried out thereon. Advantageously, the creation of the backup copy of the database (e.g., the server database 28) helps to ensure that valuable data is not inadvertently lost (i.e., this is a safety feature for preventing lost data). In one or more further embodiments, the computing device (e.g., the server computing device 20) is specially programmed so as to enable a system user to selectively choose if he or she wants to automatically create a backup copy of the database residing on his or her computing device prior to the performance of the one-way merge (e.g., by allowing a user to check a box if he or she desires to automatically perform the backup before executing the one-way merge or to uncheck the box if no backup is to be performed before the one-way merge).

3. Two-Way Merge Procedures

Figure 3:
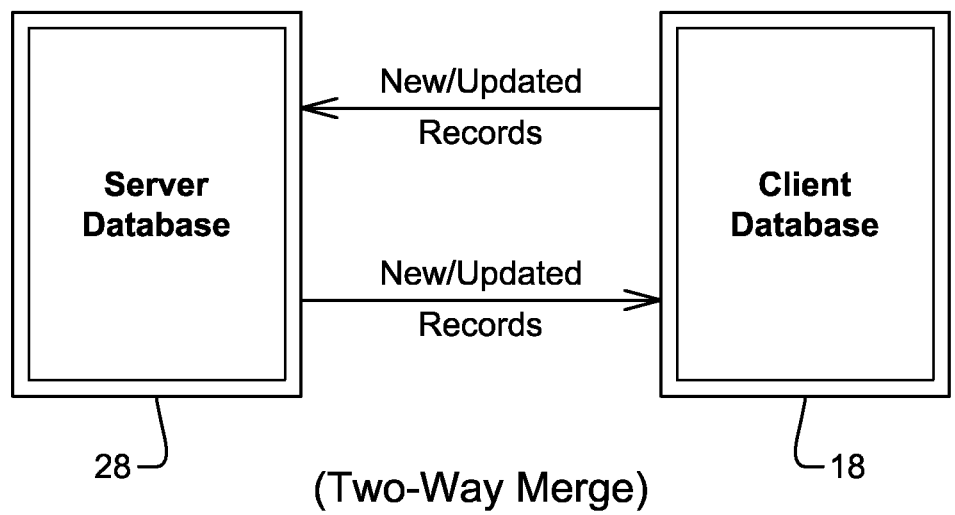
FIG. 3 is a schematic diagram illustrating the merging of two databases with one another (i.e., a two-way merge), according to an embodiment of the invention.

In FIG. 3, the merging of two databases with one another (i.e., a two-way merge) is schematically illustrated. In general, during an exemplary two-way merge procedure, new or updated records are transferred from a client database 18 (residing on one or more of the data storage device(s) 14c of the client computing device 10) to a server database 28 (residing on one or more of the data storage device(s) 24c of the server computing device 20) after it is determined that the server database 28 either does not contain one or more records in the client database 18 or contains an older version of one or more records in the client database 18. Similarly, new or updated records are transferred from the server database 28 to a client database 18 after it is determined that the client database 18 either does not contain one or more records in the server database 28 or contains an older version of one or more records in the server database 28. As described above with regard to the one-way merge, the records transferred between the client and server databases 18, 28 can comprise various forms of data. For example, the records could include any of the following: (i) operator data for an individual conducting subject testing, (ii) anatomical data for a test subject, (iii) numerical data acquired during the testing of a subject, or (iv) a graphical depiction of a test subject. However, one of ordinary skill in the art will readily appreciate that these are merely examples of the type of content which the records may contain. The claimed invention encompasses all possible forms of record content.

Figure 6:
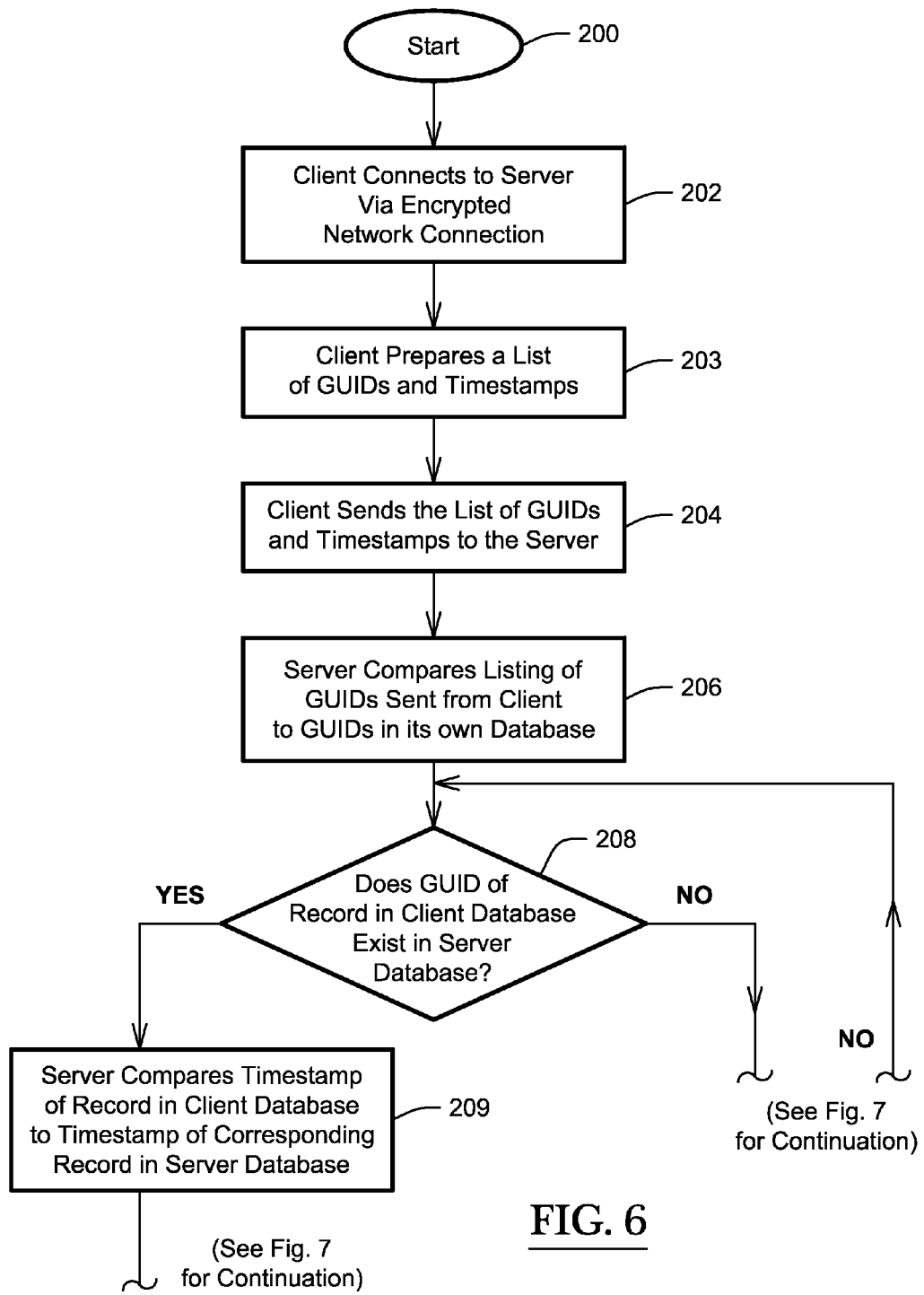
FIG. 6 is a partial flowchart illustrating a two-way merge procedure carried out by the system of FIG. 1, according to an embodiment of the invention.
Figure 7:
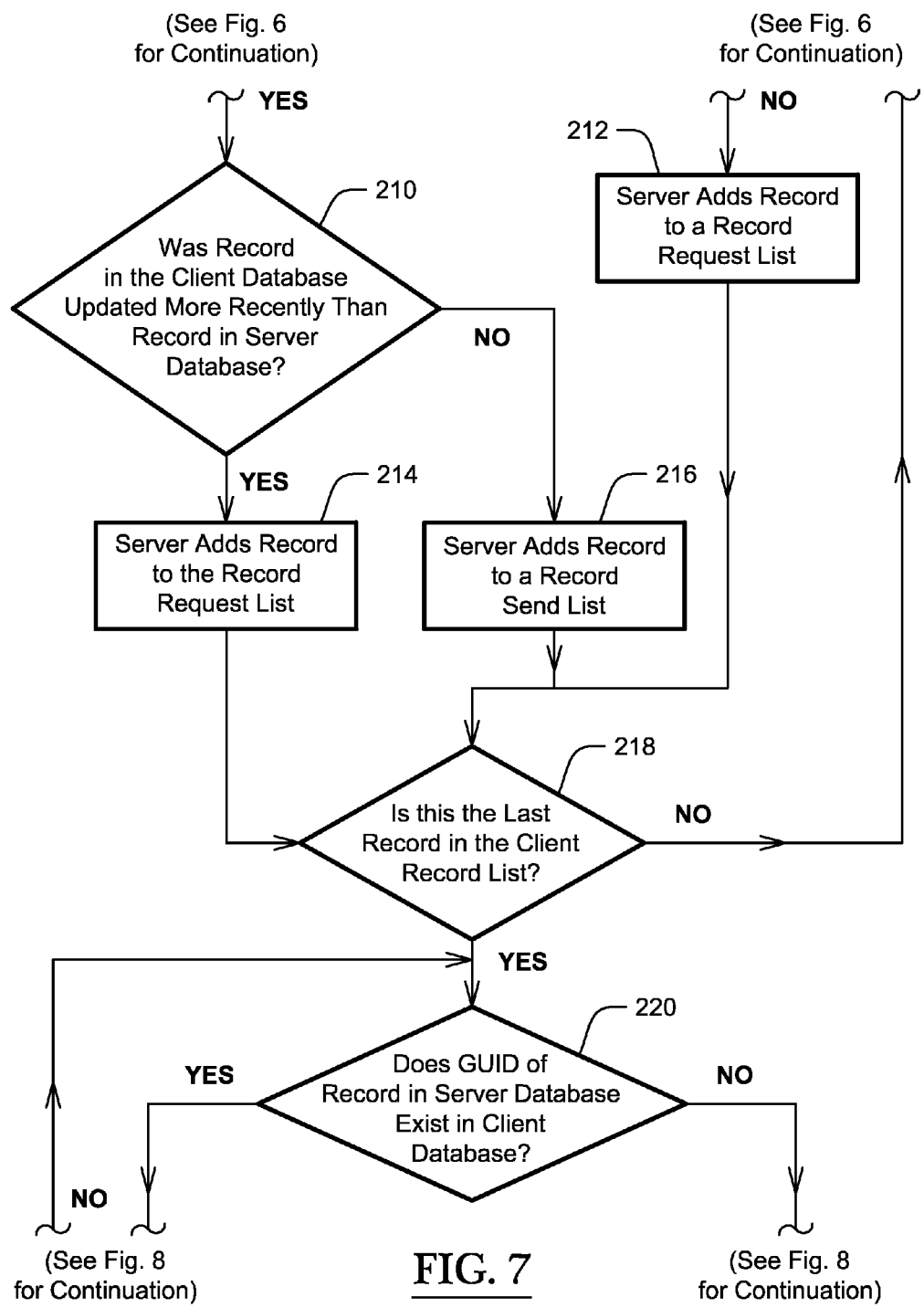
FIG. 7 is a continuation of the flowchart of FIG. 6, which illustrates additional steps of the two-way merge procedure, according to an embodiment of the invention.
Figure 8:
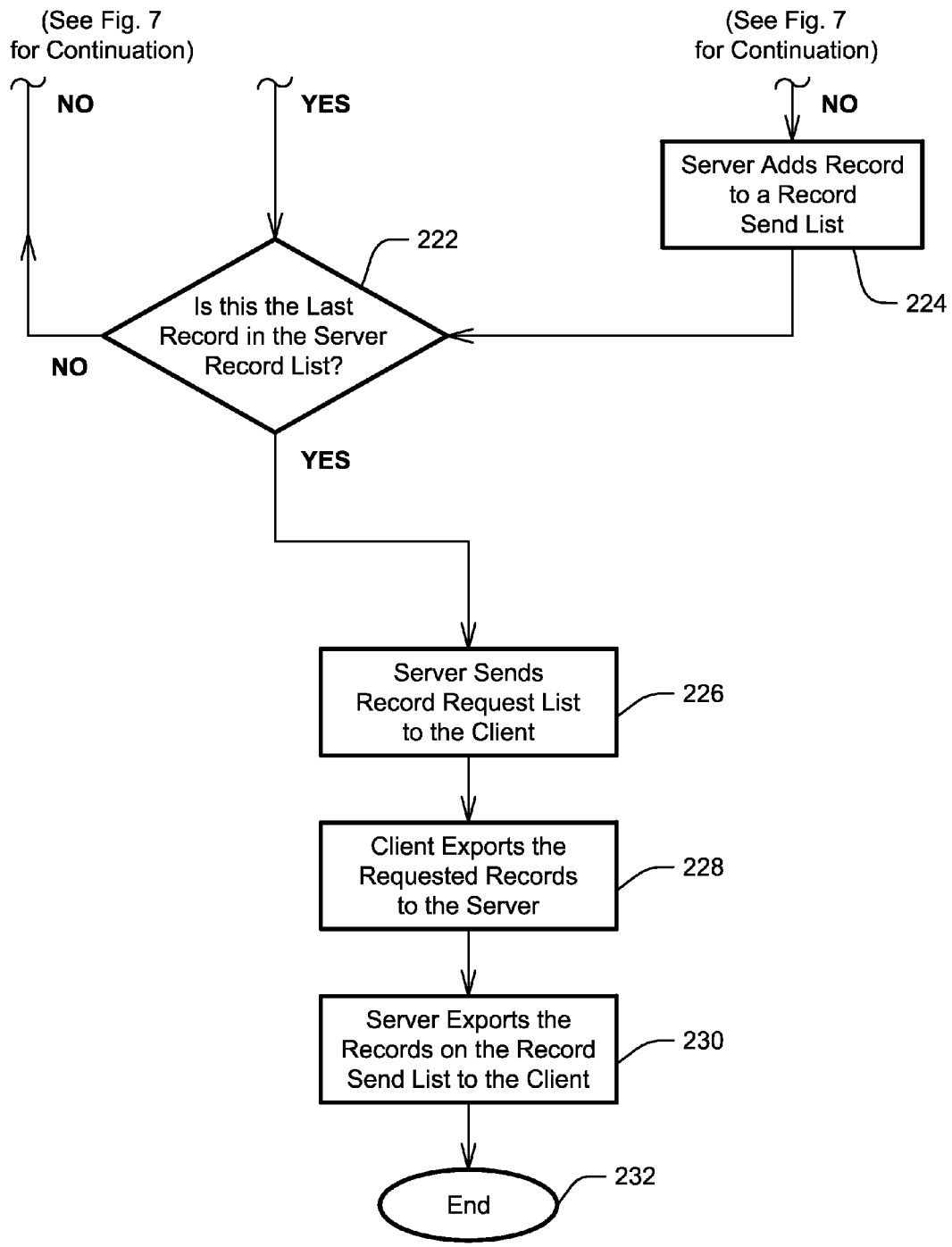
FIG. 8 is a continuation of the flowchart of FIG. 7, which illustrates additional steps of the two-way merge procedure, according to an embodiment of the invention.

In accordance with an embodiment of the invention, a flowchart illustrating a two-way merge procedure carried out by the computer system 50 of FIG. 1 is set forth in FIGS. 6-8. Referring initially to FIG. 6, the procedure commences at 200, and in step 202, the client computing device 10 ("client") connects to the server computing device 20 ("server") via a network connection 30. In a preferred embodiment, the network connection 30 between the client computing device 10 and the server computing device 20 is encrypted so that the data can be securely transmitted between the computing devices 10, 20. For example, a secure connection in the form of a standard Hypertext Transfer Protocol Secure (HTTPS) can be used. This permits the computer system 50 to securely transmit data both within a local internet and the world-wide Internet. As such, confidential or proprietary data can be safely transmitted between the computing devices 10, 20 without the fear of interception by an unauthorized third party.

Initially, in step 203, the client computing device 10 prepares a list of all database tables, unique record identifiers (i.e., GUIDs), and timestamps (i.e., last modification times), with no other data. If the content of the client database 18 was never previously seen by the server computing device 20, the client list will contain all of the record identifiers (i.e., GUIDs), and timestamps (i.e., last modification times) for all records in the client database 18. In one embodiment of the invention, as a performance enhancement feature, if the content of the client database 18 was previously seen by the server computing device 20 within some particular window of time, the client list may be trimmed so as to remove record identifiers and timestamps that have not changed in the last timeframe. Although, because the file size of the list itself is very small, and because it is further compressed with data compression techniques, this performance enhancement feature is not used in all embodiments of the invention.

The client list is generated by selecting each row of table data from the client database 18, and recording only the unique identifiers (i.e., GUIDs) and the timestamps (i.e., last modification times); no other field data is recorded or transformed. Once the client list is constructed, it is compressed and encrypted with additional error recovery checksum logic.

Then, after the client list has been generated and a network connection has been established between the client and the server, the client sends a list of globally unique identifiers (GUIDs) and timestamps, which correspond to the records in its database (i.e., the client database 18), to the server in step 204 of FIG. 6. Upon receipt of the client list, the server decrypts the list and decompresses it, using the error recovery logic if needed, and verifying the checksums. Then, in step 206, the server reads and compares the listing of globally unique identifiers (GUIDs) sent from the client to the listing of globally unique identifiers (GUIDs) in its own database (i.e., server database 28).

In step 208 (i.e., decision block 208), the server initially determines whether a GUID identifying a particular record in the client database 18 exists in the server database 28. When it is determined that a GUID identifying a particular record in the client database 18 does not exist in the server database 28, the server adds that record to a record request list (step 212 in FIG. 7). After which, in step 218, the server determines if the record added to the record request list is the last record in the client record list (i.e. the list of records residing in the client database 18). If the record added to the record request list is the last record in the client record list, the process proceeds to step 220 in FIG. 7. Otherwise, the determination in step 208 is performed for the next record in the client record list.

When it is determined that a GUID identifying a particular record in the client database 18 also exists in the server database 28, the server further compares in step 209, the timestamp of the record in the client database 18 to the timestamp of the corresponding record in the server database 28 (e.g., the timestamps expressed in Julian dates). Then, in step 210, by means of the timestamp comparison, the server determines whether the record in the client database 18 was updated more recently than the corresponding record in the server database 28. The version of the record having the most recent timestamp associated therewith (e.g., the greatest Julian date value) is deemed to be the record that was most recently updated. When it is determined that the version of the record in the client database 18 has a more recent timestamp, and thus was updated more recently, than the version of the record in the server database 28, the server adds that record to the record request list (step 214 in FIG. 7). After which, in step 218 of FIG. 7, the server determines if the record added to the record request list is the last record in the client record list. If the added record is the last record in the client record list, the process proceeds to step 220 in FIG. 7. Otherwise, the initial determination in step 208 is performed for the next record in the client record list.

On the other hand, when it is determined that the version of the record in the client database 18 has an older timestamp as compared to the version of the record in the server database 28 (at decision block 210), the process proceeds to step 216 in FIG. 7, wherein the server adds the record to a record send list. Then, in step 218 of FIG. 7, the server determines if the record added to the record send list is the last record in the client record list. If the record added to the record send list is the last record in the client record list, the process proceeds to step 220 in FIG. 7. If not, the initial determination in step 208 is carried out for the next record in the client record list. The aforedescribed process is performed by the server until each of the records in the client record list is evaluated.

In one or more embodiments, as described above, the timestamps of the records having common unique identifiers (i.e., the same GUIDs) are compared only once during the two-way merge procedure (i.e., in step 209) so as to result in an efficient and streamlined process. In other words, only one comparison of timestamps for a particular pair of records having matching unique identifiers (i.e., GUIDs) is performed during the two-way merge process. Also, in one or more embodiments of the merge processes disclosed herein, no determination is made as to whether two timestamps are equal to one another (i.e., no determination is made as to whether timestamps of records having common unique identifiers match one another).

After all of the records in the client record list have been evaluated by the server as explained above, the server proceeds with step 220 in FIG. 7. In step 220, the server further determines whether a GUID identifying a particular record in the server database 28 exists in the client database 18. When it is determined that a GUID identifying a particular record in the server database 28 does not exist in the client database 18, the server adds that record to the record send list (step 224 in FIG. 8). After which, in step 222, the server determines if the record added to the record send list is the last record in the server record list (i.e., the list of records residing in the server database 28). If the record added to the record send list is the last record in the server record list, the process proceeds to step 226 in FIG. 8. Otherwise, the determination in step 220 is performed for the next record in the server record list.

In step 220, when it is determined that a GUID identifying a particular record in the server database 28 also exists in the client database 18, the server proceeds with step 222 in FIG. 8, wherein the server determines if the record existing in both databases 18, 28 is the last record in the server record list. If the record existing in both databases 18, 28 is the last record in the server record list, the process proceeds to step 226 in FIG. 8. If not, the determination in step 220 is performed for the next record in the server record list.

After all of the records in the server record list have been evaluated by the server, the server sends the record request list to the client in step 226 of FIG. 8. Subsequently, in step 228, the client exports the requested records (i.e., an exported subset of the client database 18) to the server utilizing the network connection 30. Then, the server exports the records on the record send list (i.e., an exported subset of the server database 28) to the client in step 230 of FIG. 8 also using the network connection 30. In a preferred embodiment of the invention, the entire records are exported by both the server and the client in steps 228 and 230, rather than portions of those records. Advantageously, the exportation of the entire records, rather than just mere portions thereof, obviates the need to determine the changed content of each record thereby resulting in a simpler and more streamlined process. Once all of the designated records have been exported from the client to the server, and all of the designated records have been exported from the server to the client, the process ends at step 232.

Figure 11:
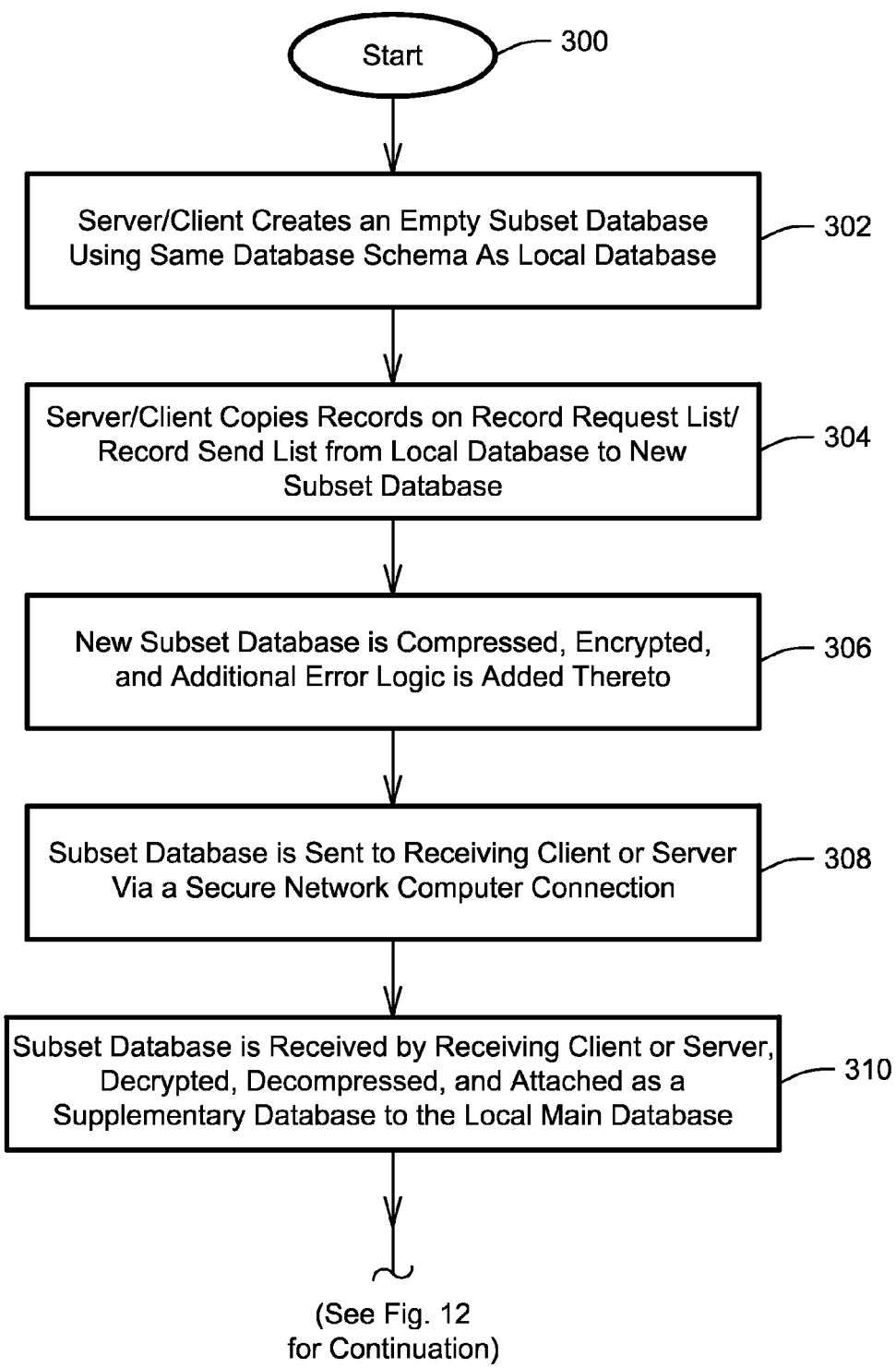
FIG. 11 is a flowchart illustrating exported database subset generation and incorporation of the database subset into the recipient database carried out during the two-way merge procedure.

In one embodiment of the invention, with reference to FIG. 11, the exported subset generation for both databases 18, 28 is performed by initially creating an empty local subset database using the same database schema as the local database 18 or 28 (in step 302, after the process has commenced at 300). This advantageously ensures that the table structures are the same. Then, using the unique record identifiers (GUIDs) for each of the items (i.e., the list sent to the client—record request list, or the internal list generated and kept by the server—record send list), the computing device 10, 20 copies the record from the main local database (18 or 28) into the new subset database (step 304). When the record is copied into the new subset database, all fields in the record are copied without regard to the field content or types. Once all of the records from either the record request list or the record send list have been copied, this new subset database is then compressed, encrypted, and has additional error logic added thereto (i.e., the same as for the lists that were sent between the computing devices 10, 20) in step 306. After which, in step 308, the subset database is sent to the receiving client or server via a secure network computer connection (e.g., Hypertext Transfer Protocol Secure (HTTPS)). Then, in step 310, once the database subset has been received by the other computing device (10 or 20), it is decrypted and decompressed, and then attached to the local main database (18 or 28) as a supplementary database thereto (e.g., the "OtherDatabase").

Figure 12:
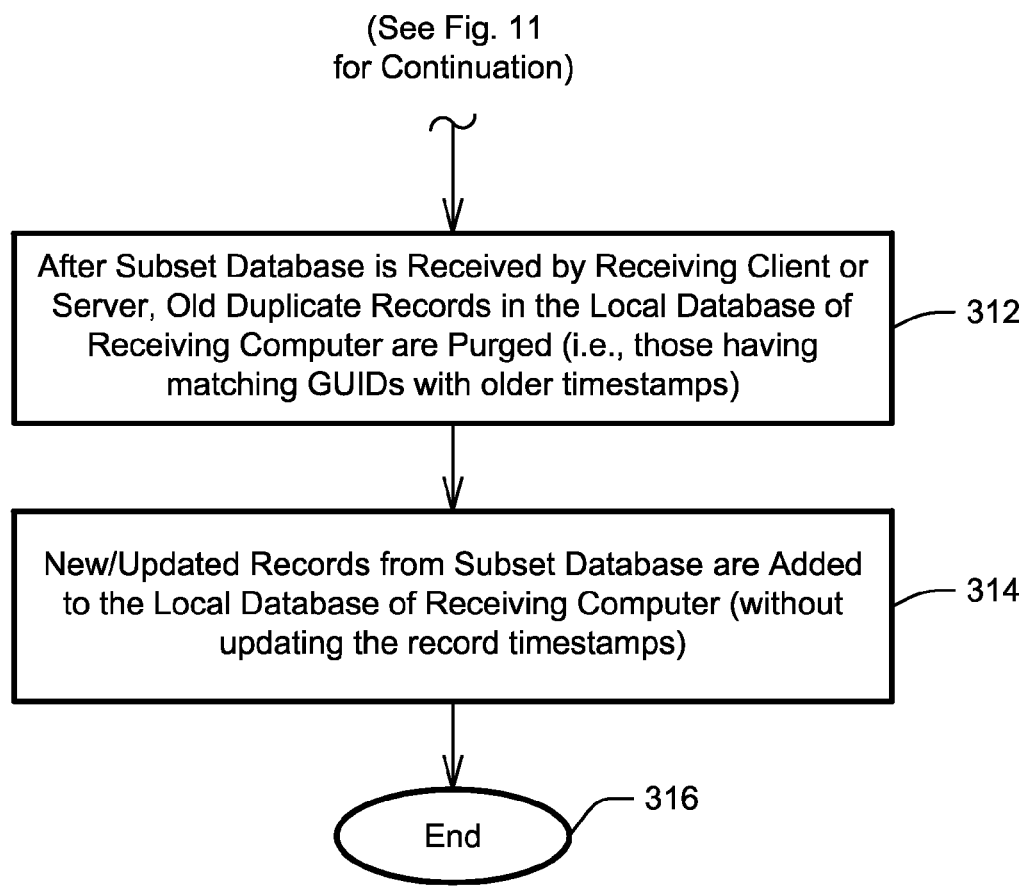
FIG. 12 is a continuation of the flowchart of FIG. 11, which illustrates additional steps of the exported database subset generation and incorporation of the database subset into the recipient database carried out during the two-way merge procedure.

Turning to FIG. 12, after the database subset has been received by the other computing device (10 or 20), the old duplicate records in the database residing on that computing device (10 or 20) are initially purged in step 312 using, for example, the following programming logic:

```
for each record OTHER in OTHERDATABASE table
    tablename
and
for each record TARGET in TARGETDATABASE table
    tablename
    where record TARGET
    has TARGET record field record_id=OTHER record
        field record_id
    and
    OTHER record field modification_time is greater than
        TARGET record field modification_time
    then
    DELETE record TARGET from TARGETDATABASE
        table tablename
    end where
end for each TARGET
end for each OTHER
```

The above lines of exemplary code delete all records from the target database 18 or 28 ("TARGETDATABASE") that have the same unique record identifier (i.e., GUID) as a record in the database subset ("OTHERDATABASE") and have a modification time (i.e., Julian date) that is older than the record with the matching record identifier in the target database 18 or 28. Then, after the old duplicate records have been removed from the target database, the new/updated records from the database subset are added to the target database in step 314 using, for example, the following programming logic:

```
for each record OTHER in OTHERDATABASE table
   tablename
   where record OTHER
   has OTHER record field record_id that does not appear
      in TARGET record field record_id
   then
      create new record in TARGETDATABASE table
         tablename using
      each OTHER record field values with restriction of do
         not
      update TARGET record field modification time
   end where
end for each OTHER
```
The lines of exemplary code set forth above create new records in the target database 18 or 28 ("TARGETDATABASE") for any records of the database subset ("OTHERDATABASE") having a unique record identifier (i.e., GUID) that is not already included in the target database 18 or 28. The content of the newly created records in the target database 18 or 28 is based upon the content of the corresponding records in the database subset. The modification time (i.e., the timestamp) of each record inserted into the target database 18 or 28 from the database subset remains unchanged (i.e., it is not updated). Once all of the records have been inserted into each of the target databases 18, 28, the two-way merge process is complete (at step 316 of FIG. 12).

In a further embodiment, the one-way and two-way merge procedures described hereinbefore are user-forced operations. That is, the one-way and two-way merge procedures are initiated by a user (e.g., the user can implement the one-way merge procedure by selecting a "one-way merge" option in the software program, or alternatively, the two-way merge procedure by selecting a "two-way merge" option in the program). In this further embodiment, there is no background initiation action by the software program itself.

Also, in this further embodiment, at least one of the computing devices (i.e., at least one of the client computing device 10 and the server computing device 20) is additionally programmed to enable a system user to selectively choose between one of the following two operational modes: (i) a one-way merge mode, wherein the first database is merged with the second database by utilizing a data transfer device configured to make a copy of the first database available to the second computing device; and (ii) a two-way merge mode, wherein the first and second databases are merged with one another by utilizing the network connection operatively connecting the first and second computing devices to each other.

Moreover, in one or more further embodiments, a user of a particular computing device (i.e., a user of the client computing device 10 or the server computing device 20) must enable access to his or her computing device. In particular, the computing device (e.g., 10 or 20) is specially programmed to prompt a user to enable or disable access to his or her computing device by others for performing a two-way merge. Thus, unless a user explicitly enables access to his or her computing device (e.g., by checking a box in the software program) via a local network, other users will be unable to gain access to his or her computing device (e.g., 10 or 20) for the purpose of performing a two-way merge. Advantageously, this feature prevents unauthorized access to the user's computing device, thereby protecting the confidentiality of the data residing thereon. In one or more embodiments of the invention, when a user initiates a two-merge procedure, he or she will be prompted to select from a list of accessible databases residing on one or more remote computing devices (i.e., all of these other users have granted the user initiating the two-way merge access to their computing devices). Then, after having been presented with this list, the user initiating the two-way merge is able to select which of the databases from the list are to be merged with the database residing on his or her computing device (e.g., by checking a box next to the database with which the merge is to be performed). If a user in the local network has not granted access to his or computing device (e.g., 10 or 20) for the purpose of performing two-way merges, then the database residing on his or her computing device will not appear in the list. Once, the user initiating the two-way merge selects the desired databases, with which a two-way merge is to be performed, the steps of the two-way merge procedure described above are performed.

In still a further embodiment of the invention, one of the computing devices listed in the two-way merge list is a cloud-based, remote computing device. For example, a user of the two-way merge software program may be given an option to subscribe to a cloud-based server. When the user of the two-way merge software program has a such a subscription, the cloud-based server will automatically appear in the list of accessible databases, with which a two-way merge is capable of being performed.

In yet a further embodiment, the user is prompted to initiate the two-way merge process. In one particular exemplary embodiment, the user is prompted to initiate the two-way merge process after he or she performs a series of tasks using the computing device (10 or 20). For example, the user could be using the client computing device 10 in order to perform a series of tests (e.g., subject tests using an measurement instrument operatively coupled to the client computing device 10), and record the acquired test data in the client database 18 residing on the client computing device 10. At the conclusion of the final test in the test series of this exemplary embodiment, the user is prompted (e.g., by a dialogue box on the output screen 12) to determine whether he or she wishes to perform the two-way merge process. If the user elects to perform the two-way merge process, then the new and updated records on the client computing device 10 are merged with the records residing on the server computing device 20.

In one or more alternative embodiments, the two-way merge is performed automatically on a scheduled basis. For example, a particular computing device (i.e., the client computing device 10 or the server computing device 20) is specially programmed to automatically perform a scheduled two-way merge with another computing device (e.g., with a cloud-based, remote computing device) after a predetermined period of time has elapsed (e.g., every twenty-four (24) hours or at the end of each workday).

Alternatively, or in addition to being performed on a scheduled basis, the two-way merge could be performed as a result of a certain event trigger. For example, if the databases 18, 28 were being used to store data from a series of experimental tests (e.g., subject tests) being performed by an operator using the computing devices 10, 20, the conclusion of a particular test in the test series could automatically trigger the start of the two-way merge process. In one such example, the operator/user might be performing a first series of tests using the client computing device 10. The test results from the first series of tests together with subject (patient) information manually entered by the operator/user would then be stored in the client database 18. After which, the operator/user performs a second series of tests using the server computing device 20, and test results are stored in the server database 28. In this scenario, when the operator/user switches to the server computing device 20 to perform the second series of tests, the two-way merge process is performed automatically at the conclusion of the last test in the first test series. As a result, the new and/or updated records entered into the client database 18 during the first testing series are automatically transferred to the server database 28 residing on the server computing device 20 prior to the commencement of the second test series. Preferably, the two-way merge process is performed in a quasi-instantaneous manner so that the new and/or updated records are available to the operator/user as soon as he or she transfers to the server computing device 20 (i.e., the duration of the two-way merge process is approximately equal to, or less than the time that it takes for the operator/user to transfer to the server computing device 20). Therefore, advantageously, the operator/user would not have to reenter the same subject (patient) information in the server computing device 20, and the test results from the first testing series would be available at the server computing device 20, as well as at the client computing device 10. While the event trigger in this particular example is the conclusion of a particular test in a test series, it is to be understood that other events could be used to trigger the automatic two-way merge process. In addition, a similar event trigger could be used in conjunction with the one-way merge process as well.

In another embodiment, a resumable two-way database merge or two-way network synchronization with sub-grouping of common computing devices or computing systems is provided. In this embodiment, before a computing device or system can be used with the synchronization operation, it needs to be configured so as to belong to a named group. This named group is referred to as a sync group and is used to organize computing devices or systems that belong together on the same network. This sync group name may be any valid character string.

In this embodiment, each configured computing device or computing system that belongs with a sync group is referred to as a station. Stations are peers with each other. A station does not need to be on the same local area network (LAN) as other stations. Rather, a station may actually exist as a virtual web service on an Internet web site.

Each station may assign itself a random long unique identifier value called a station identifier or station id. In one embodiment, the station identifier is a globally unique identifier (GUID), but in other embodiments, it may be any other unique string or identifier that is unique within the sync group. The station identifiers are used to uniquely identify a station within a sync group, and are used as part of the outgoing data buffering information, along with initial record filtering.

In this embodiment, each station keeps track of which other stations it has communicated with in the past (e.g., either as a server or a client). This tracking information maintained by each station includes the station identifier, the assigned internet protocol (IP) address and network name of the station, the last time the station was communicated with (which is used for filtering the initial record list), the last time a full re-check of the filter list was done, and a count of how many times connection failures have resulted. A station with a high connection failure rate may be removed from the list of known peers, or downgraded to a peer that should be connected to less frequently.

Figure 13:
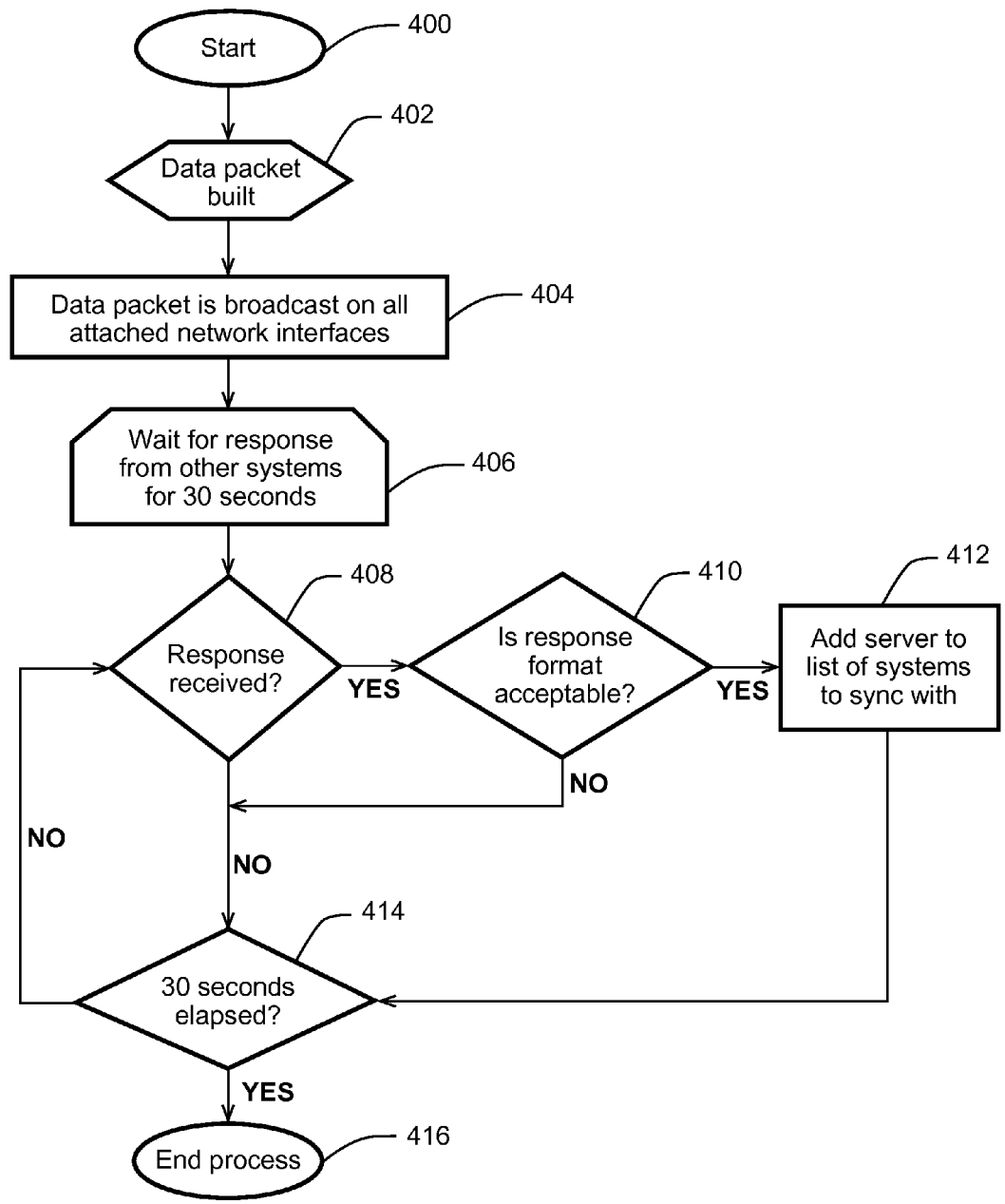
FIG. 13 is a flowchart illustrating a computing station discovery process via UDP for a two-way merge or synchronization protocol, according to an embodiment of the invention.

When the stations are present on a local area network, such as an intra-office network, then the sync system will perform a station discovery using User Datagram Protocol (UDP) broadcasts (as illustrated in the flowchart of FIG. 13). That is, any configured stations with the matching sync group will be added to the list of stations to be communicated with during the sync exchange. In this embodiment, the UDP broadcast will only work with properly configured intra-office network systems; the UDP broadcast does not function over the Internet, and can be blocked by office network administrators. For this, the protocol supports known peers, which the users pre-configure prior to the sync operations, which would have otherwise been automatically discovered via UDP broadcasts. This may also be used to communicate with a web service that would otherwise not be reachable.

When a station connects with another station peer, this is called a sync exchange; this exchange may be done on a schedule (such as every 30 minutes), or when some other event occurs (a set of related records have been updated). This sync exchange is where a client computing device 10 initiates contact with the other system and discovers which records have been updated or created and need to be sent or received. The list of stations to contact can either be gathered during the UDP station discovery, or by a manually-entered list of known peers.

Referring now to the flowchart of FIG. 13, an exemplary two-way sync stationary discovery via UDP will be described. Initially, the station discovery process commences at step 400, and then in step 402, the client computing device 10 builds a data packet that at least includes an application version, a sync group, and a database schema. Next, the data packet is broadcast on all attached network interfaces in step 404 by the client computing device 10. In step 406, the client computing device 10 waits for a response from the other computing systems in the network for thirty (30) seconds. Then, in step 408, the client computing device 10 determines whether or not any response(s) have been received thereby. If no response has been received by the client computing device 10 in step 408, the client computing device 10 further determines in step 414 if a thirty (30) second waiting interval has yet elapsed. In step 414, if the thirty (30) second waiting interval has elapsed, the process ends at 416. Alternatively, if the thirty (30) second waiting interval has not yet elapsed in step 414, the process reverts back to decision block 408, wherein the client computing device 10 again determines if a response has been received.

When it is determined by the client computing device 10 that a response has been received by the server computing device(s) 20 in step 408, the client computing device 10 further determines in step 410 whether or not the response format of the server computing device(s) 20 is acceptable. For example, the client computing device 10 determines if the response from the server computing device(s) 20 contains the proper sync group, program name, or database schema version. If the server response format is determined by the client computing device 10 to be unacceptable, the process proceeds to step 414, wherein it is determined if the thirty (30) second waiting interval has elapsed yet. Conversely, if the client computing device 10 determines in step 410 that the server response format is acceptable, the client computing device 10 will add the server computing device(s) 20 to the list of computing systems to sync with in step 412. Following step 412, the process proceeds to step 414, wherein it is determined if the thirty (30) second waiting interval has elapsed.

It is to be understood that the station discovery process described in conjunction with FIG. 13 is not used in all implementations of the two-way sync method of the present embodiment. Rather, some implementations of the two-way sync method of the present embodiment utilize other means to assemble a list of peers in the network (e.g., a manually-entered list of known peers).

In this embodiment, the sync exchange protocol between peers (e.g., between a client computing device 10 and a server computing device 20) utilizes a secure sockets layer (SSL) hypertext transfer protocol (HTTP) as the communication medium in order to facilitate the use of the protocol outside of local area network (LAN) and over the Internet.

All sync exchanges are initiated by the client station (i.e., the client computing device 10); the target station, called the server computing device 20, receives the connection. The server station (i.e., the server computing device 20) can be another computer workstation running the same application as the client (i.e., the client computing device 10), or a web service implementing the same protocol and acting as a clearinghouse or hub. Both the client computing device 10 and the server computing device 20 can communicate with multiple stations at the same time, and all stations can work as both a client and a server simultaneously.

For each command that the client computing device 10 sends to the server computing device 20, it will typically always send the following information that the server computing device 20 will check for validity and compatibility: (i) the protocol version of the sync protocol, (ii) the identifier of the client computing device 10 or client station, (iii) the name of the client computing device 10 or client station, (iv) the sync group that the client computing device 10 belongs to, that it expects the server computing device 20 to also be part of, (v) the database schema version, and (vi) the application name and application version that the client computing device 10 is using (and that the server computing device 20 should support).

If the server computing device 20 finds an error or a mismatch, or detects other communication problems (such as the client computing device 10 apparently trying to communicate multiple times on multiple network addresses, missing information, too many attempts in a short period of time, etc.), then the server computing device 20 will respond with an appropriate error value, using the standard HTTP error values (400 to 499, inclusive).

For each of the protocol commands that the client computing device 10 sends, which may or may not have additional data, and that the server computing device 20 accepts, the server computing device 20 will respond back with a specific result.

In the flowcharts of FIGS. 14-17, the client side of the two-way sync protocol flow, which is performed for each station in the contact list, is illustrated. The server side of the two-way sync protocol flow is shown in the flowcharts of FIGS. 18-23.

Figure 14:
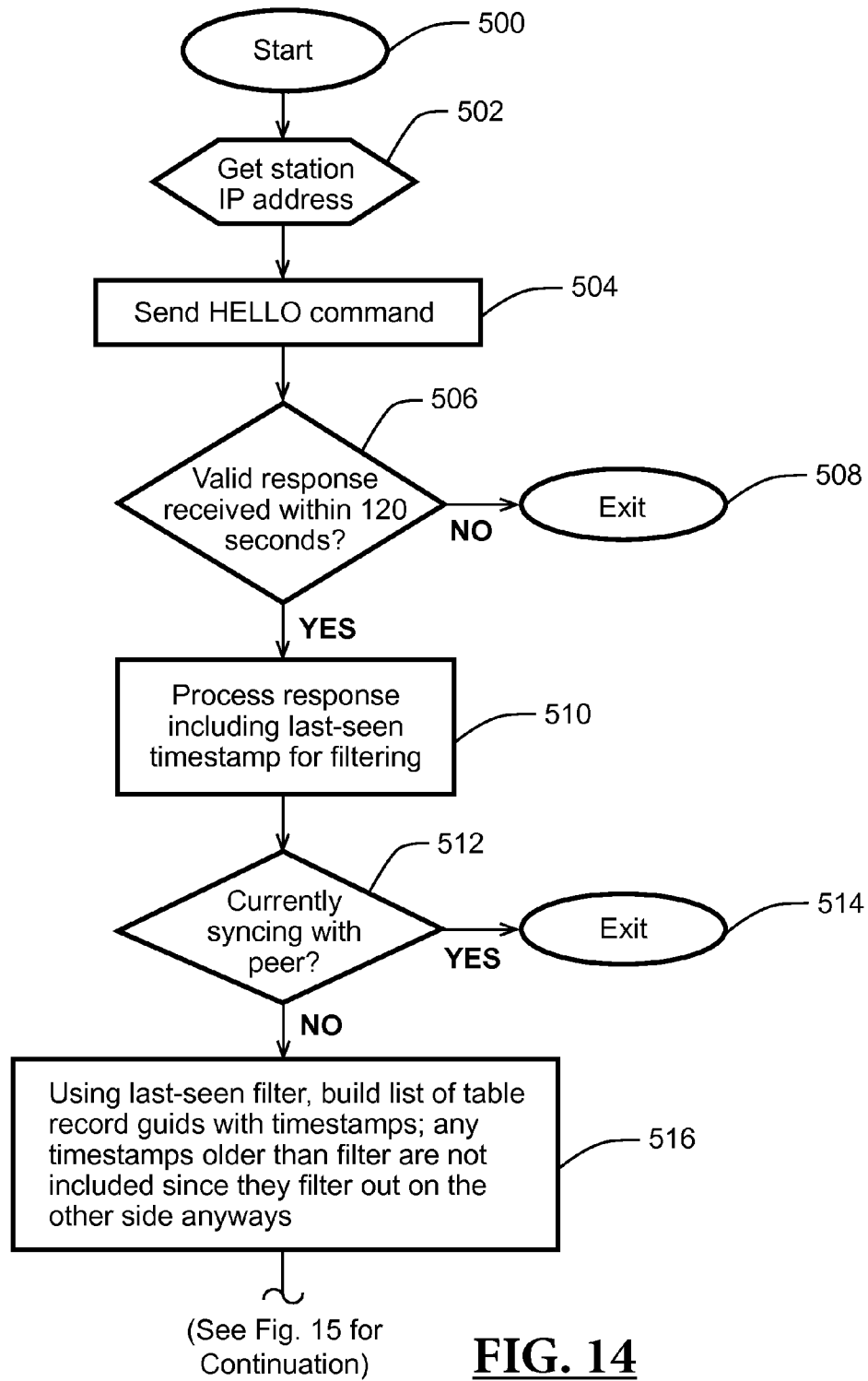
FIG. 14 is a partial flowchart illustrating a client side of a two-way merge procedure carried out by the system of FIG. 1, according to another embodiment of the invention.

The client computing device 10 commences the client side of the process at step 500 in FIG. 14, and then in step 502, the client computing device 10 retrieves the station IP address of the server computing device 20. Next, in step 504 of FIG. 14, the client computing device 10 sends out a "HELLO" command or request, which does not contain any additional data.

Figure 18:
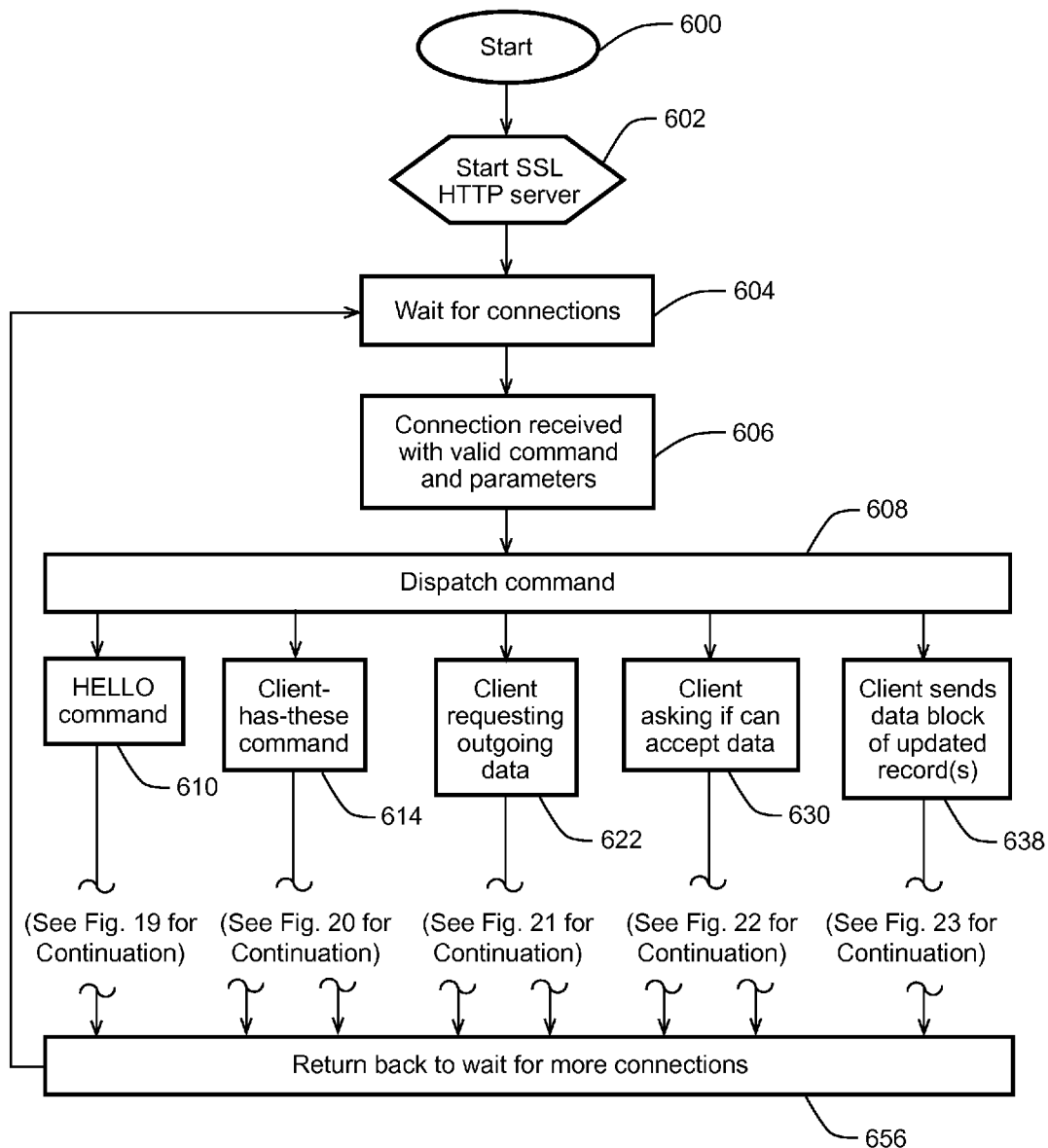
FIG. 18 is a partial flowchart illustrating a server side of a two-way merge procedure carried out by the system of FIG. 1, according to the another embodiment of the invention.
Figure 19:
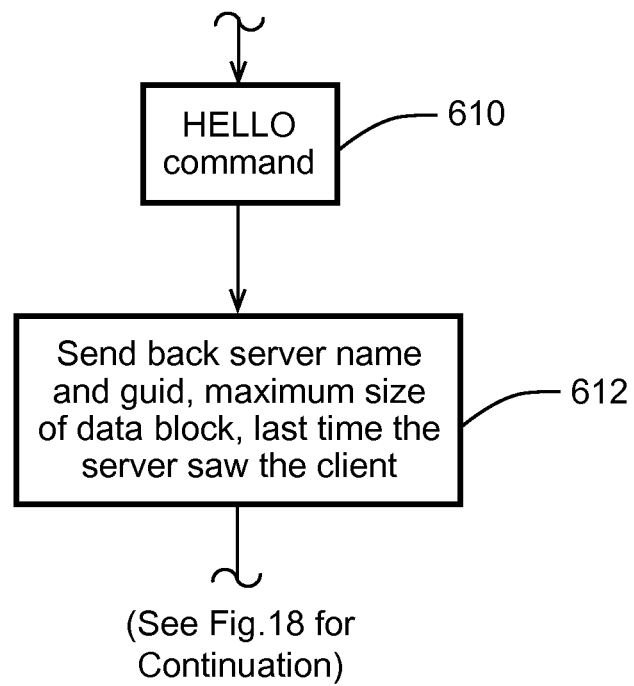
FIG. 19 is a continuation of the flowchart of FIG. 18, which illustrates additional steps of the server side of the two-way merge procedure (i.e., steps associated with responding to a "HELLO" command from the client)
Figure 20:
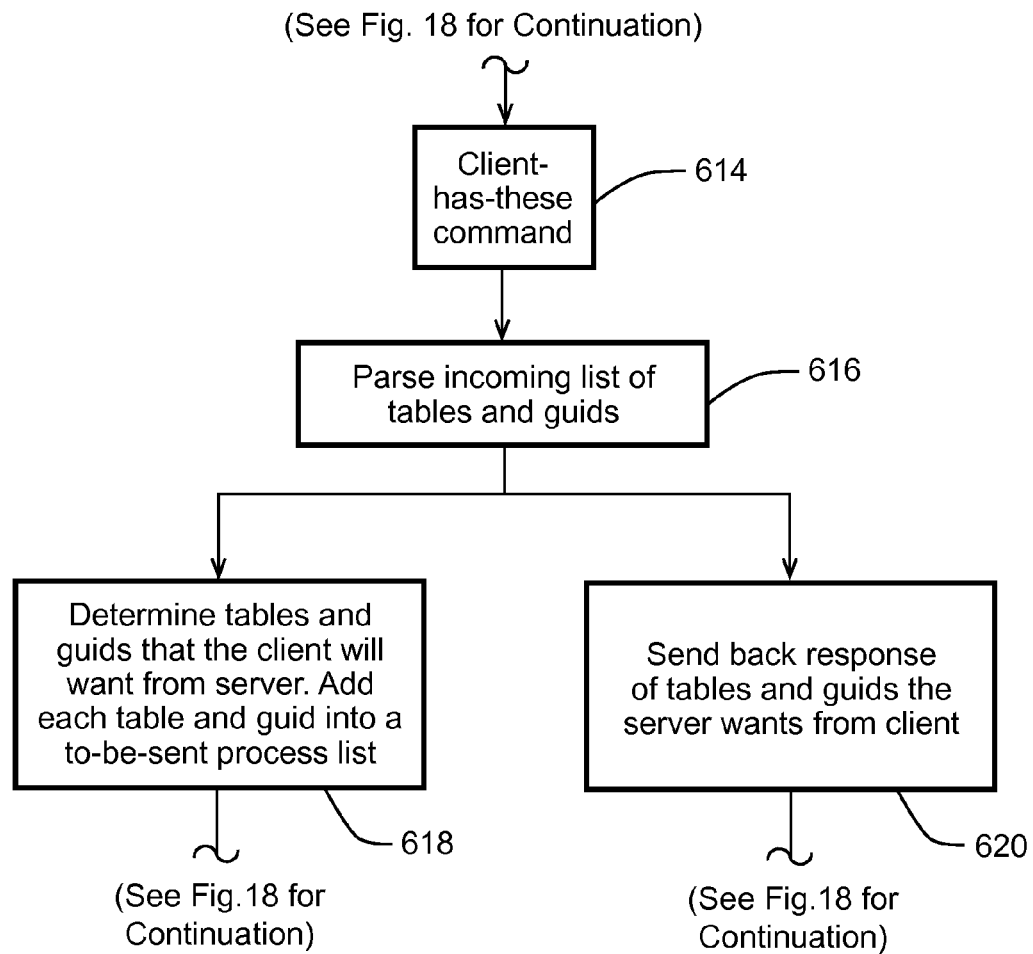
FIG. 20 is another continuation of the flowchart of FIG. 18, which illustrates additional steps of the server side of the two-way merge procedure (i.e., steps associated with responding to a "client-has-these" command from the client)

Now, turning to FIG. 18, the server side of the process is commenced at step 600, and then in step 602, a SSL HTTP server computing device 20 is started. Next, in step 604, the server computing device 20 waits for connections (i.e., from a client computing device 10). In step 606, a connection is received by the server computing device 20 with a valid command and parameters. Then, in step 608, one of the dispatch commands 608 is received by the server computing device 20 from the client computing device 10. Initially, when the "HELLO" command is sent out by the client computing device 10 in step 504 of the client process flow, the server computing device 20 receives the "HELLO" command from the client computing device 10 in step 610 of FIGS. 18 and 19. After which, in step 612, the server computing device 20 sends the following information back to the client computing device 10 in a response: (i) the server's own station identifier (e.g., GUID) and network name, (ii) the maximum size of the data block that the server computing device 20 can accept as one payload, and (iii) the last time the server computing device 20 saw the client computing device 10 (e.g., in the form of a Julian date of the last time that the server computing device 20 got a previous "HELLO" request from the client computing device 10). This last-time-we-talked Julian date is used by both the client computing device 10 and server computing device 20 to pre-filter the record unique identifier (e.g., GUID) and timestamp list that is built and used.

Referring back to the client process flow in FIG. 14, in step 506, the client computing device 10 determines if a valid response is received within one-hundred and twenty (120) seconds from the server computing device 20. If no valid response is received within one-hundred and twenty (120) seconds from the server computing device 20 in step 506, the process flow of the client side ends at step 508. However, if a valid response is received within one-hundred and twenty (120) seconds from the server computing device 20 in step 506, the client computing device 10 processes the response from the server computing device 20 in step 510, wherein the server response includes the last-seen timestamp value for filtering purposes (i.e., as sent in step 612 of the server process flow—FIG. 19). Both the client computing device 10 and the server computing device 20 keep track of the last-seen timestamp value. The client computing device 10 compares the last-seen timestamp value received back from the server computing device 20 in step 510 to its own last-seen timestamp value. If the last-seen timestamp value of the server computing device 20 is sufficient differently (e.g., it differs by more than five minutes) from the last-seen timestamp value of the client computing device 24, then the last-seen timestamp value will be set to zero and the complete list of records in the client and server databases 18, 28 will be compared to one another in step 616 by the server computing device 20. Next, in step 512 of FIG. 14, the client computing device 10 determines if it is currently syncing with a peer (i.e., the server computing device 20). If it is determined that the client computing device 10 is currently syncing with a peer (i.e., the server computing device 20) in step 512, the process flow of the client side ends at step 514. However, if it is determined in step 512 that the client computing device 10 is not currently syncing with a peer (i.e., the server computing device 20), then the client computing device 10 builds a list of table record GUIDs with timestamps using the last-seen filter in step 516. Any records with timestamps older than the filter value (e.g., last-time-we-talked Julian date) are not included in the list because they would filter out on the other side anyway. For example, if the filter value comprises a Julian date of "2455896.10596" (corresponding to Wednesday, Nov. 30, 2011 at 14:32:34.9 UT), then records having timestamps less than "2455896.10596" (i.e., timestamps older than Wednesday, Nov. 30, 2011 at 14:32:34.9 UT) are not included in the list because they would filter out on the other side anyway.

In step 516 of FIG. 14, the client station or client computing device 10 uses this last-time-we-talked Julian date to filter out any record values that the client computing device 10 builds and sends to the server computing device 20; if there is no last-time Julian date, then all of the record GUIDs and last-modification values (i.e., timestamps) are sent to the server computing device 20. With a large database, the sending of all of the record GUIDs and timestamps can result in several hundreds of kilobytes of data sent each and every time, regardless of whether or not any actual records have been changed. However, with the last-time Julian date filter being used, only records that have been changed or created since that value are sent as the list; this drastically reduces the payload side from 100 kilobytes or more (100k+) to 500 bytes or less, typically zero.

Figure 15:
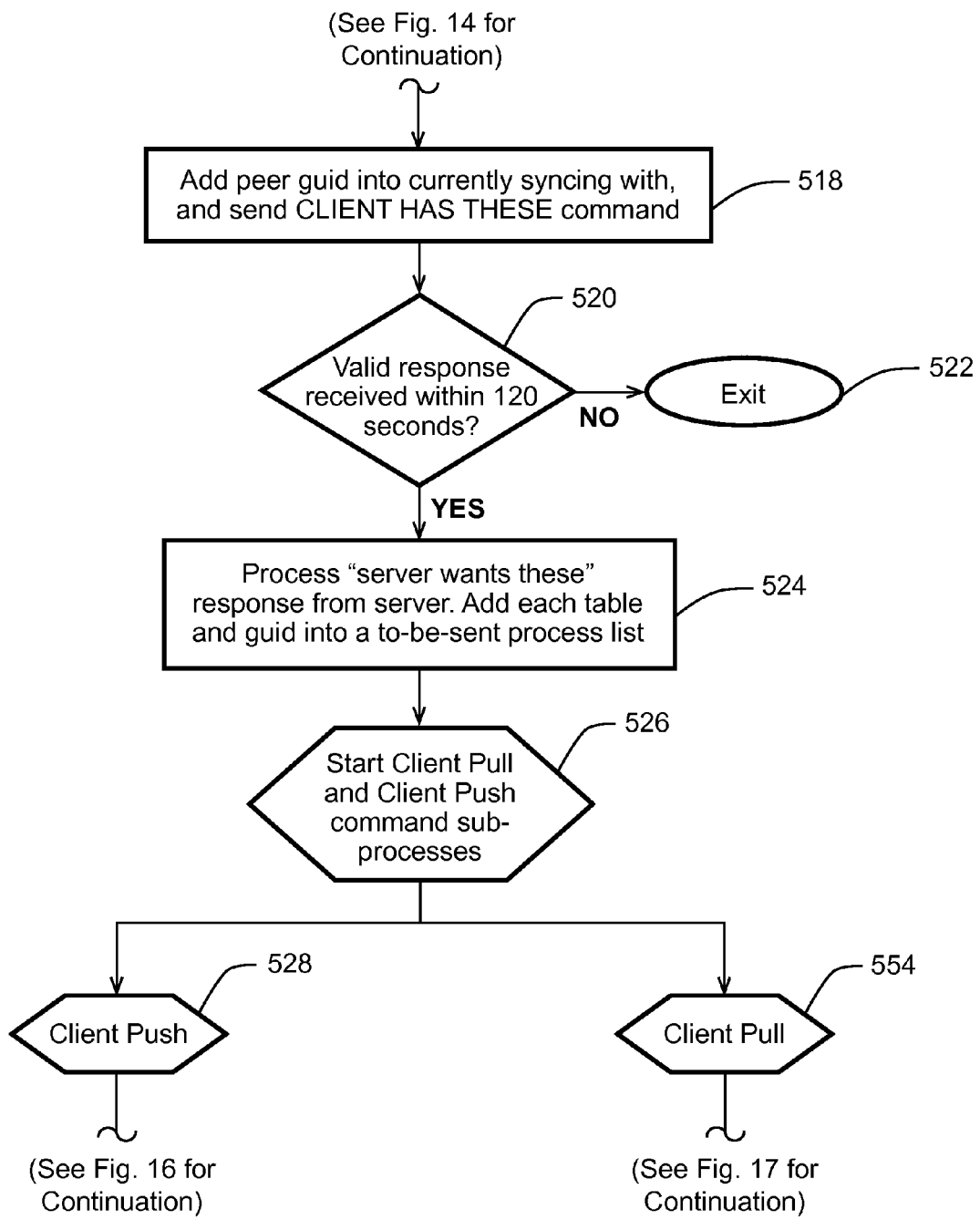
FIG. 15 is a continuation of the flowchart of FIG. 14, which illustrates additional steps of the client side of the two-way merge procedure.

Referring now to FIG. 15, in step 518, the client station or client computing device 10 adds the peer GUID into currently syncing with (i.e., the peer GUID is stored in the memory of both the client computing device 10 and the server computing device 20 as a security measure), and sends the "CLIENT HAS THESE" command to the server computing device 20. The record identifier and last modification list, which is developed using the filtering technique implemented by the client computing device 10 is sent to the server computing device 20 as a "CLIENT HAS THESE" command. The server computing device 20 uses this list of tables, record ids, and last modification values, along with the same last-time-we-talked Julian date (or zero if no such date exists) to build up a list of both what it will be sending to the client (i.e., a record send list) and a list of what it expects the client to start sending back to it (i.e., a record request list). The server computing device 20 then sends this list of tables and record ids back to the client as the server's response to this command. Then, in step 520, the client computing device 10 determines whether or not it receives a valid response from the server computing device 20 within one-hundred twenty (120) seconds. If the client computing device 10 does not receive a valid response within 120 seconds, the process flow of the client side ends at step 522. Conversely, if the client computing device 10 does receive a valid response within 120 seconds, then it proceeds with step 524 in the process flow of the client side. Turning to the server side in FIG. 20, the server computing device 20 receives the "CLIENT HAS THESE" command from the client computing device 10 in step 614 (i.e., receives the list of GUIDs and timestamps). Then, in step 616, the server computing device 20 parses the incoming list of tables, GUIDs, and timestamps (i.e., the filtered list) from the client computing device 10 (see FIG. 20). The parsing of the incoming list of tables, GUIDs, and timestamps by the server computing device 20 is generally the same as that described above in the connection with FIGS. 6-8, and as the two-way merge example that will be explained in conjunction with FIG. 10 hereinafter. Although, rather using the complete lists of GUIDs and timestamps from the client and server databases 18, 28 as is done in the embodiment of FIGS. 6-8, the parsing performed by the server computing device 20 in the present embodiment utilizes filtered lists of GUIDs and timestamps, which are pre-filtered using the timestamp filter. After which, the server computing device 20 performs the two process steps 618 and 620 in parallel, each process being performed independently of the other. First, in step 618, the server computing device 20 determines tables and GUIDs that the client computing device 10 will want from the server computing device 20. The server computing device 20 adds each table and GUID into a "to-be-sent" process list (i.e., a record send list). Secondly, while simultaneously performing step 618, the server computing device 20 sends back a response of tables and GUIDs that the server computing device 20 wants from the client computing device 10 in step 620 of FIG. 20 (i.e., a record request list). After the server builds the "to-be-sent" process list, and while it sends it to the client computing device 10, it also copies these values into a "to-be-exported" queue. This queue is processed behind the scenes in the application to build packaged data that will later be picked up by the client computing device 10 when it makes a request for this data. The queue is processed until it is empty, or the pre-packaged data buffer is full. Once these process steps are complete, the server computing device 20 proceeds to step 656 in FIG. 18, wherein it returns back to step 604 to wait for more connections.

Referring again to the protocol flow for the client side in FIG. 15, the client computing device 10 receives the result from the "CLIENT HAS THESE" command as a "Server Wants" response in step 524. Namely, in step 524, the client computing device 10 processes the "server wants these" response from the server computing device 20. The client computing device 10 uses this list of records (i.e., record request list from server) to start the exact same "to-be-exported" queue process and then, in step 526, starts two new separate client-server commands running in parallel: a "client pull" (i.e., beginning in step 554 of FIG. 15) and a "client push" (i.e., beginning in step 528 of FIG. 15).

Figure 21:
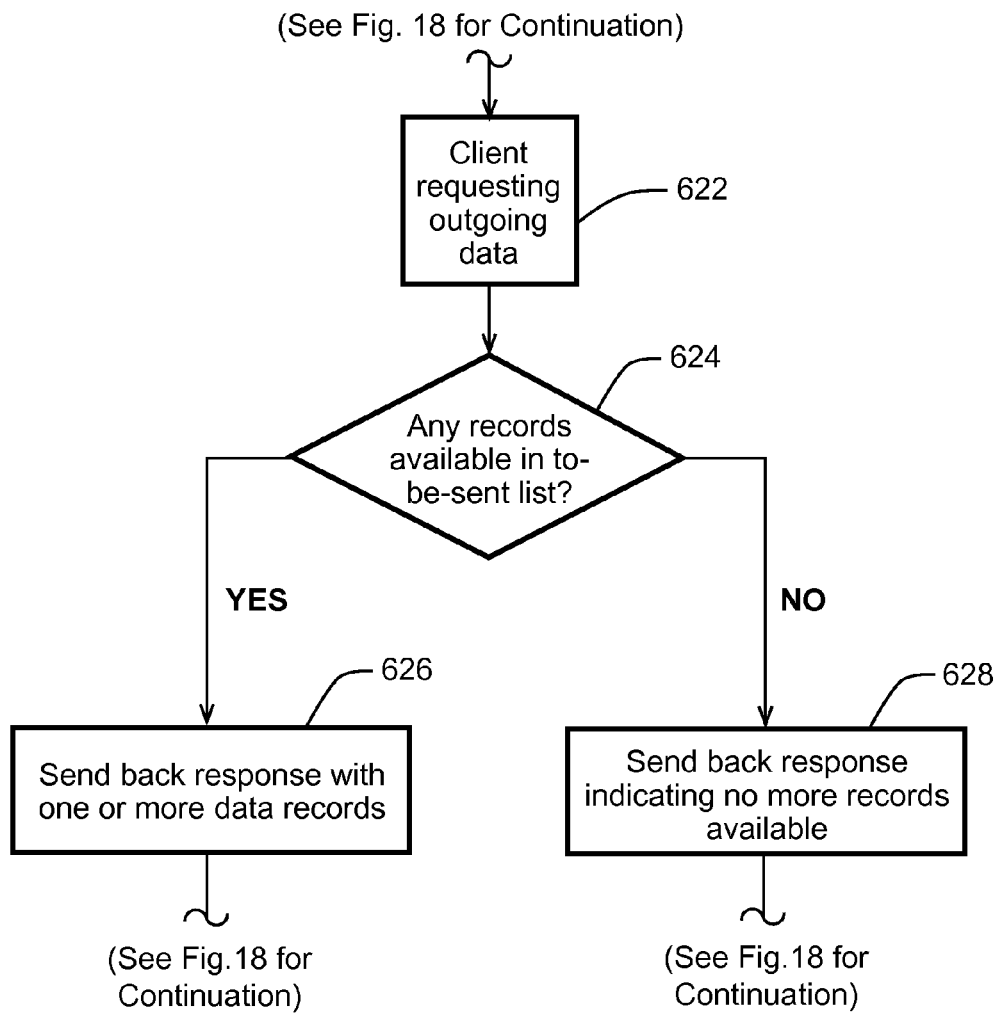
FIG. 21 is yet another continuation of the flowchart of FIG. 18, which illustrates additional steps of the server side of the two-way merge procedure (i.e., steps associated with responding to the request of the client for outgoing data)

Initially, the client pull sub-process will be described with reference to FIG. 17 for the client side, and FIG. 21 for the server side. The "pull from server to client" command is "REQUESTCLIENTUPDATES", in which the client computing device 10 just asks the server computing device 20 for data from its pre-packaged queue that was built from the "to-be-exported queue" of the server computing device 20. In general, this data is sent by the server computing device 20, received by the client computing device 10, decoded, applied, and this command is repeated until the server computing device 20 responds with "no more data". Once this occurs, the client command quits. The client computing device 10 may make this data request at any time, without needing the first HELLO command of step 504. The server computing device 20 will respond with data if it has it, or indicate there is no data. If the client computing device 10 makes too many requests (flood detection) or makes the same request from two different network addresses in a set period of time, the server computing device 20 will deny the request. The server computing device 20 will also deny the request if the client requests data for a different sync group, program name, or database schema version.

Now, the particulars of the client pull process will be explained with reference to FIGS. 17 and 21. Beginning with the client side in FIG. 17, the client computing device 10 sends a "data request" command to the server computing device 20 in step 556. Then, in step 558, the client computing device 10 determines if a valid response is received within one-hundred and twenty (120) seconds from the server computing device 20. If the client computing device 10 does not receive a valid response within 120 seconds, the process flow of the client side ends at step 560. Conversely, if the client computing device 10 does receive a valid response within 120 seconds, then it proceeds with step 562 in the process flow of the client side. Turning to the server side in FIG. 21, the server computing device 20 receives the "CLIENT REQUESTING OUTGOING DATA" command from the client computing device 10 in step 622. Then, in step 624 of FIG. 21, the server computing device 20 determines if any records are available in the "to-be-sent" list (i.e., a record send list). If the server computing device 20 determines that one or more records are available in the "to-be-sent" list (and in the server export queue), the server computing device 20 sends back a response to the client computing device 10 with one or more data records in step 626. However, if the server computing device 20 determines that no records are available in the "to-be-sent" list, the server computing device 20 sends back a response indicating that no more records are available in step 628 of FIG. 21. Once either step 626 or step 628 is complete, the server computing device 20 proceeds to step 656 in FIG. 18, wherein it returns back to step 604 to wait for more connections.

Figure 17:
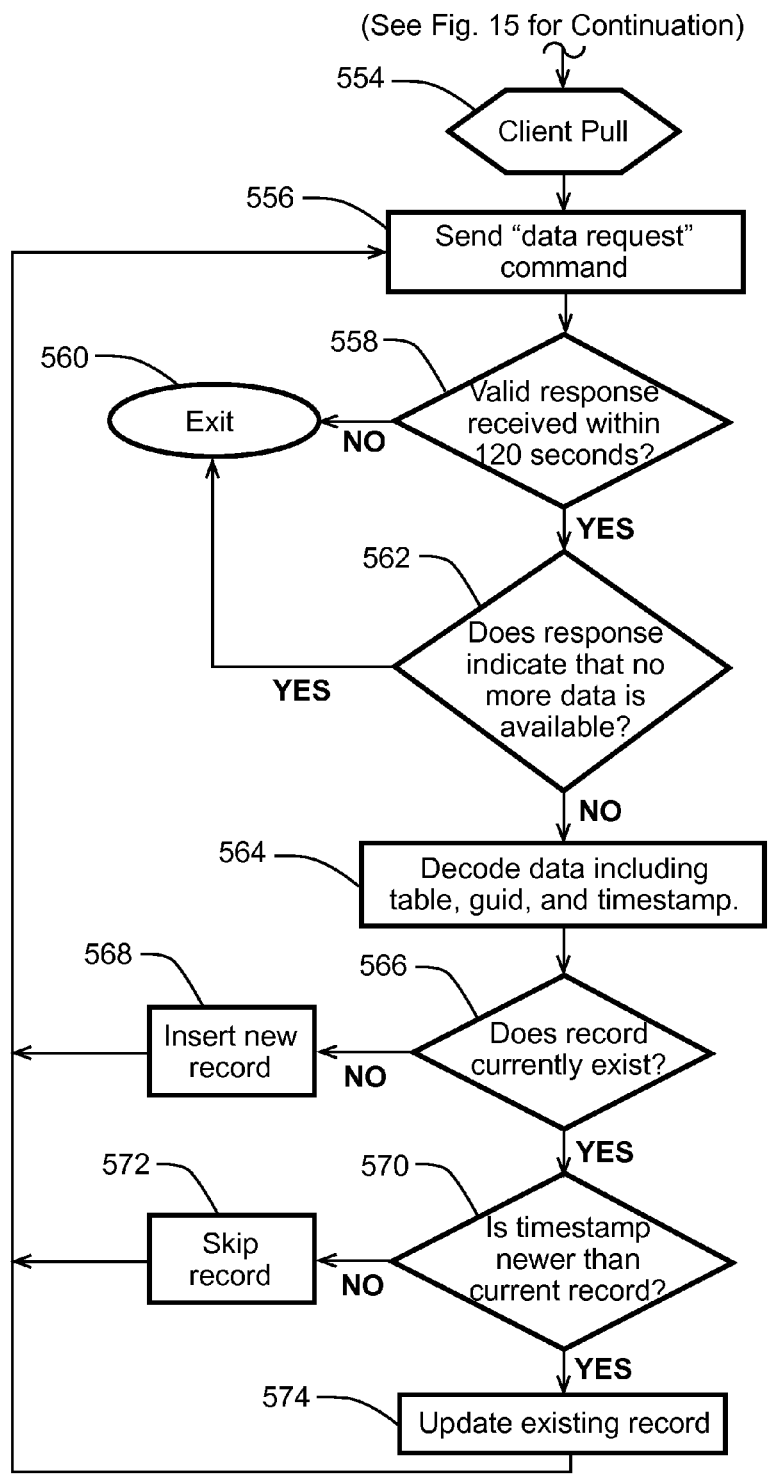
FIG. 17 is another continuation of the flowchart of FIG. 15, which illustrates additional steps of the client side of the two-way merge procedure (i.e., steps associated with a client pull)

With reference again to the protocol flow for the client side in FIG. 17, the client computing device 10 determines in step 562 if the response from the server computing device 20 indicates that no more data is available. If the client computing device 10 does determine in step 562 that no more data is available from the server computing device 20, the process flow of the client side ends at step 560. Conversely, if the client computing device 10 determines that the response from the server computing device 20 indicates that more data is available, the client computing device 10 proceeds to step 564, wherein the client computing device 10 decodes the data from the server computing device 20, the data including one or more tables, one or more GUIDs, and one or more timestamps. In general, the client computing device 10 decodes each "pulled" server data record, and applies if the record is newer than what exists or if it is a fresh new record. If the record would replace an existing record on the station that has a newer timestamp than the incoming data, then the record data is ignored. Particularly, turning again to FIG. 17, the client computing device 10 determines, in step 566, if the record currently exists in the client database 18. If the record does not exist in the client database 18, the client computing device 10 inserts the new record in step 568, and then reverts back to step 556 of FIG. 17. However, if the record does currently exist in the client database 18, the client computing device 10 further determines if the record from the server database 28 of the server computing device 20 has a timestamp that is newer than the current record in the client database 18 in step 570 of FIG. 17. If the timestamp of the record from the server database 28 is newer than the timestamp of the corresponding record in the client database 18, the client computing device 10 updates the existing record in its database 18 in step 574, and reverts back to step 556 of FIG. 17, wherein it again sends a "data request" command. Conversely, if the timestamp of the record from the server database 28 is older than the timestamp of the corresponding record in the client database 18, the client computing device 10 skips the record in step 572, and then reverts back to step 556.

Figure 22:
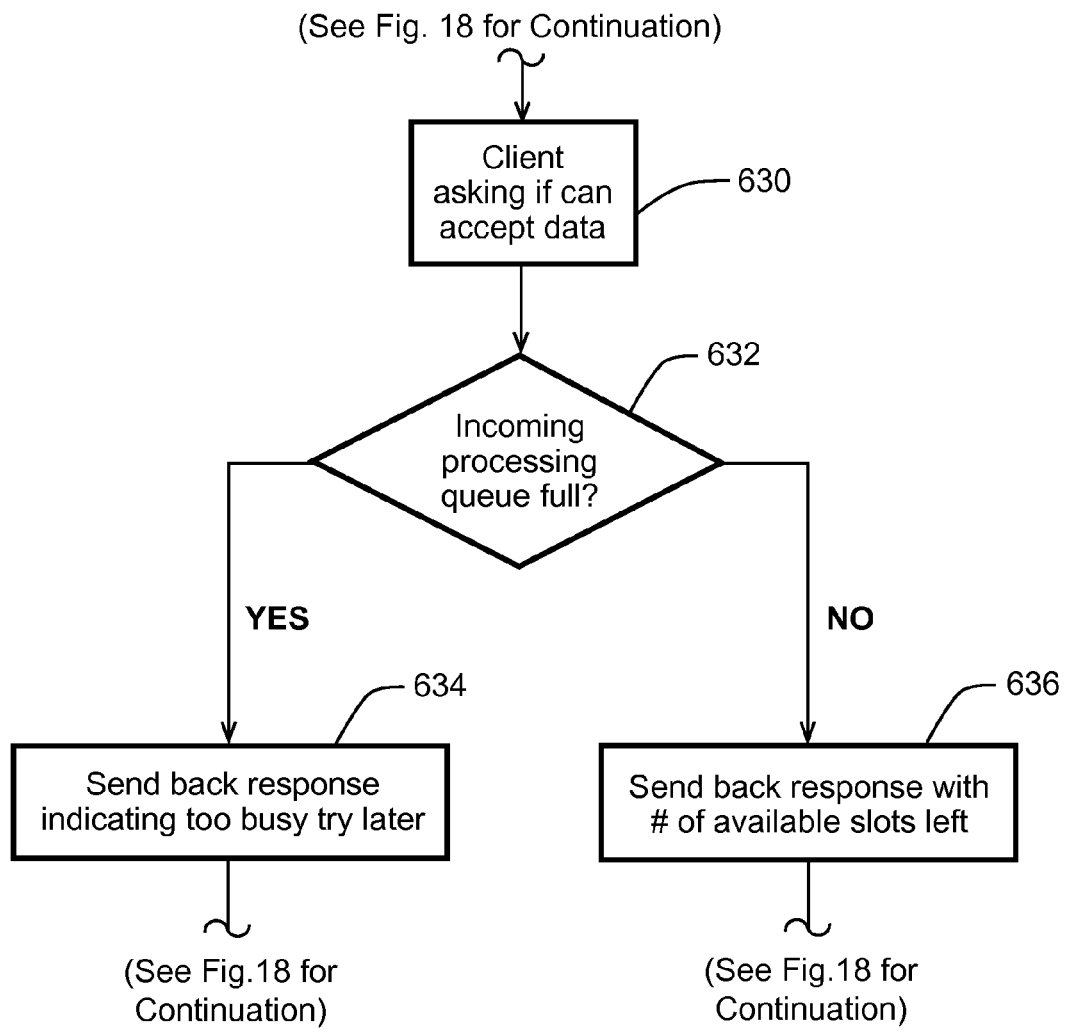
FIG. 22 is still another continuation of the flowchart of FIG. 18, which illustrates additional steps of the server side of the two-way merge procedure (i.e., steps associated with responding to the client asking if the server can accept data)

Next, the client push sub-process will be described with reference to FIG. 16 for the client side, and FIGS. 22 and 23 for the server side. The "push to server from client" command actually comprises two-parts: the client computing device 10 asks the server computing device 20 "can you accept data?", and the server computing device 20 responds with either "yes" or "no, too busy, try later". The client computing device 10 then uses its own to-be-exported queue and prepackaged data to be sent to the server computing device 20, and repeats this until there is nothing left to send, at which time it quits. The client computing device 10 can make this command request without the needing the first HELLO or other commands; the server computing device 20 can elect to ignore or accept the data as needed.

In general, the server computing device 20 accepts each incoming "pushed" client data record, decodes it, and applies if it the record is newer than what exists or if it is a fresh new record. If the record would replace an existing record on the station that has a newer timestamp than the incoming data, then the record data is ignored. If the client computing device 10 attempts to make too many requests (flood detection) or makes the same request from two different network addresses in a set period of time, the server computing device 20 will deny the request. The server computing device 20 will also deny the request if the client computing device 10 requests data for a different sync group, program name, or database schema version.

Now, the particulars of the client push process will be explained with reference to FIGS. 16, 22, and 23. Beginning with the client side in FIG. 16, the client computing device 10 reads the "to-be-sent" list (i.e., record request list) of tables and record GUIDs from the server computing device 20 in step 530. Then, in step 532, the client computing device 10 determines if any more records are to be sent from the client computing device 10 to the server computing device 20. If no more records are to be sent from the client computing device 10 to the server computing device 20, the process flow of the client side ends at step 534. Conversely, if more records are to be sent from the client computing device 10 to the server computing device 20, then the client computing device 10 sends the "can you accept data" command to the server computing device 20 in step 536 of FIG. 16. Turning to the server side in FIG. 22, the server computing device 20 receives the "CLIENT ASKING IF YOU CAN ACCEPT DATA" command from the client computing device 10 in step 630. Next, in step 632, the server computing device 20 determines if its incoming processing queue is full. If the server computing device 20 determines that its incoming processing queue is full, the server computing device 20 sends back a response to the client computing device 10 indicating that the server is "too busy, try again later" in step 634. However, if the server computing device 20 determines that its incoming processing queue is not full, the server computing device 20 sends back a response to the client computing device 10 indicating the number of available slots that are left in the processing queue (e.g., 10 slots left) in step 636 of FIG. 22. Once either step 634 or step 636 is complete, the server computing device 20 proceeds to step 656 in FIG. 18, wherein it returns back to step 604 to wait for more connections.

Figure 16:
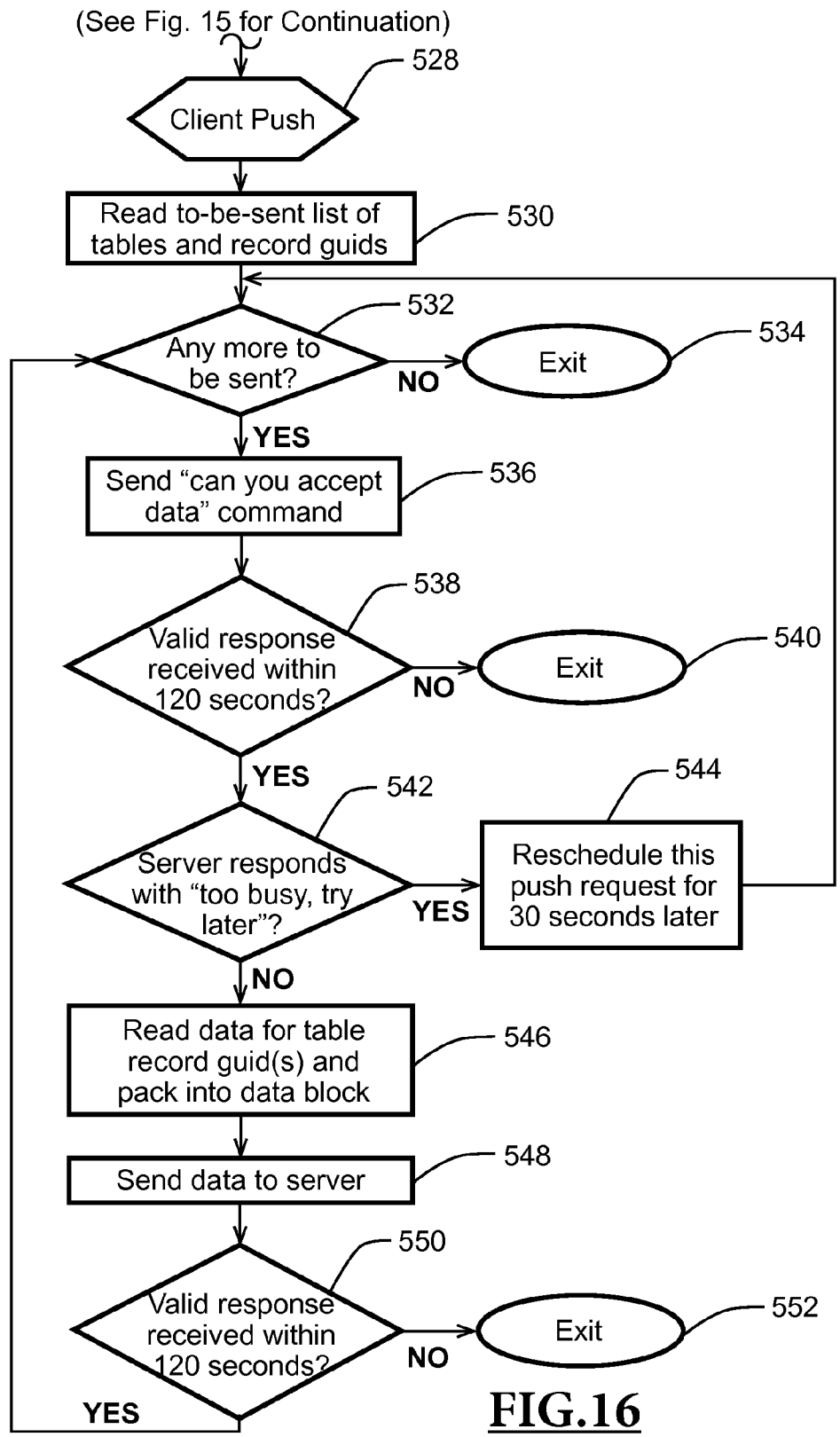
FIG. 16 is a continuation of the flowchart of FIG. 15, which illustrates additional steps of the client side of the two-way merge procedure (i.e., steps associated with a client push)

With reference again to the protocol flow for the client side in FIG. 16, the client computing device 10 determines in step 538 if a valid response is received within one-hundred and twenty (120) seconds from the server computing device 20. If no valid response is received within one-hundred and twenty (120) seconds from the server computing device 20 in step 538, the process flow of the client side ends at step 540. However, if a valid response is received within one-hundred and twenty (120) seconds from the server computing device 20 in step 538, the client computing device 10 further determines, in step 542, if the server computing device 20 responds with "too busy, try later". If the client computing device 10 determines that the server computing device 20 has responded "too busy, try later", the process proceeds to step 544, wherein the client computing device 10 reschedules the push request for thirty (30) seconds later. After step 544, the protocol flow of the client side reverts back to step 532. Conversely, if the client computing device 10 determines that the server computing device 20 has not responded "too busy, try later", the client computing device 10 will read the data for table record GUIDs and pack it into a data block in step 546 of FIG. 16. Next, in step 548, the client computing device 10 sends the data to the server computing device 20. After which, in decision block 550, the client computing device 10 determines if a valid response is received within one-hundred and twenty (120) seconds from the server computing device 20. If no valid response is received within one-hundred and twenty (120) seconds from the server computing device 20 in step 550, the process flow of the client side ends at step 552. However, if a valid response is received within one-hundred and twenty (120) seconds from the server computing device 20 in step 550, the client computing device 10 reverts back to step 532, wherein it again determines if there are any more records to be sent.

Figure 23:
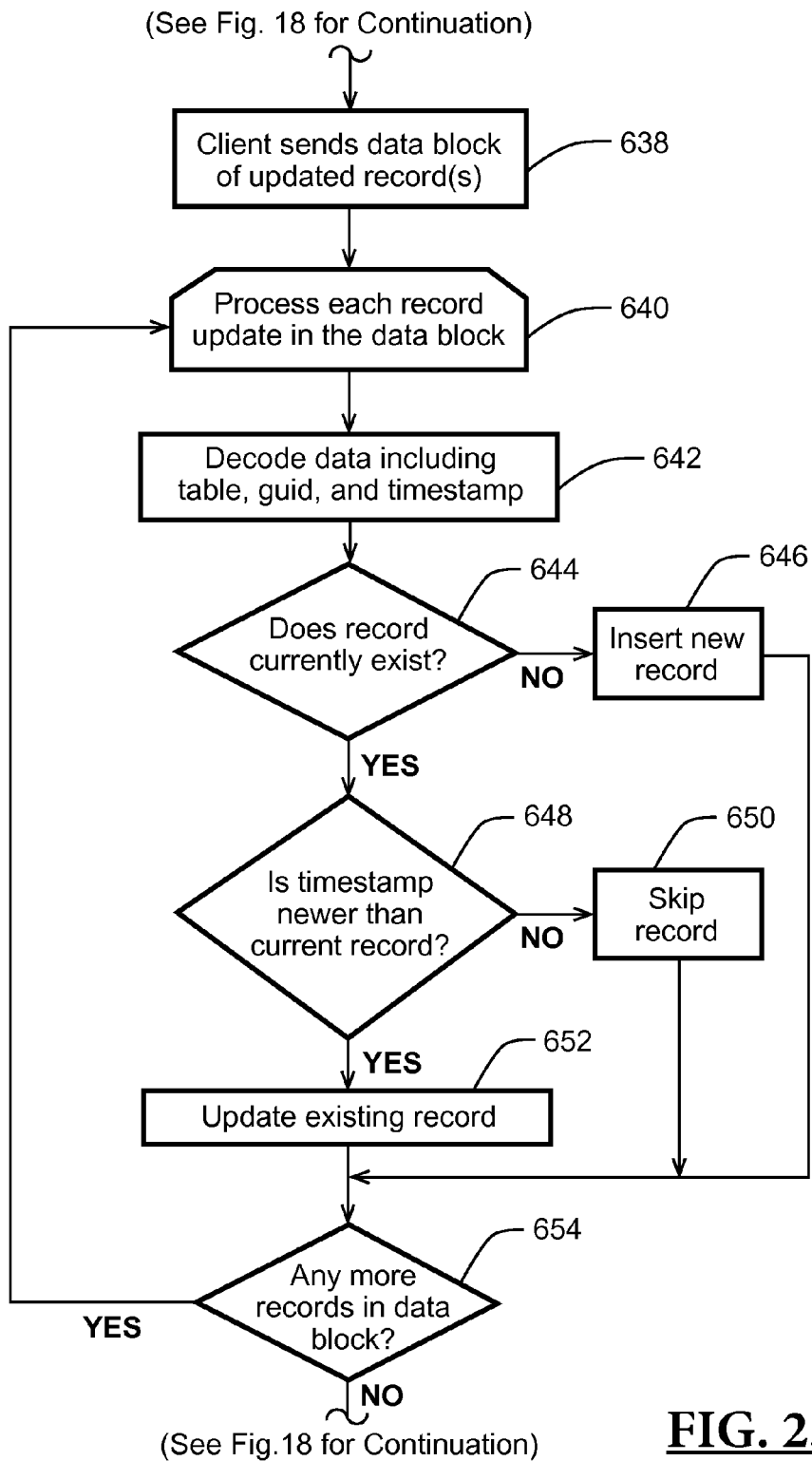
FIG. 23 is yet another continuation of the flowchart of FIG. 18, which illustrates additional steps of the server side of the two-way merge procedure (i.e., steps associated with responding to the client sending a data block of updated records).

Turning again to the server side, and with reference to FIG. 23, the server computing device 20 receives the data block of one or more updated records in step 638, which were sent from the client computing device 10 in step 548 of the protocol flow of the client side. In step 640, the server computing device 20 processes each record update in the data block sent from the client computing device 10. Then, in step 642 of FIG. 23, the server computing device 20 decodes the data including the table, GUID, and timestamp for each record. After which, in decision block 644, the server computing device 20 determines if the record currently exists in the server database 28. If the record does not exist in the server database 28, the server computing device 20 inserts the new record in step 646, and then proceeds to step 654 of FIG. 23, wherein it is determined if there are any more records in the data block sent from the client computing device 10. However, if the record does currently exist in the server database 28, the server computing device 20 further determines if the record from the client database 18 of the client computing device 10 has a timestamp that is newer than the current record in the server database 28 in step 648 of FIG. 23. If the timestamp of the record from the client database 18 is newer than the timestamp of the corresponding record in the server database 28, the server computing device 20 updates the existing record in its database 28 in step 652, and then proceeds to decision block 654 of FIG. 23, wherein it is determined if there are any more records in the data block sent from the client computing device 10. Conversely, if the timestamp of the record from the client database 18 is older than the timestamp of the corresponding record in the server database 28, the server computing device 20 skips the record in step 650, and then proceeds to step 654. At decision block 654 of FIG. 23, if the server computing device 20 determines that there are more records in the data block sent from the client computing device 10, the server computing device 20 reverts back to step 640, wherein it processes the next record update in the data block. However, if the server computing device 20 determines that there are no more records in the data block sent from the client computing device 10, the server computing device 20 proceeds to step 656 in FIG. 18, wherein it returns back to step 604 to wait for more connections.

In the processes explained in conjunction with this embodiment, each data record to and from the client computing device 10 to the server computing device 20 is formatted the same: (i) a table name this record applies to, (ii) the field names of the record, and (iii) the record data itself. The record is decoded and the values of the record GUID and record last modification time/date (i.e., timestamp) are used to determine if the record should be added or replaced. If the timestamp of the data record that was sent or received is older than or the same as what is currently on the local system (which is possible if the queue was built on the opposite system, and then the local data is modified, or if more than one sync connections are in process and one updates before another), then the new data in the packaged record is ignored. Only if the new record's last modification time/date (i.e., timestamp) is newer than the current local record will the data be overwritten, or if there is no matching existing record with the record GUID, in which case, the timestamp of the local data is treated as "0".

Each packaged data record consists of one or more table data records. An exemplary format is:
Table Name
# of fields
Field Name[,Field Name[,etc]]
Field Data[,Field Data[,etc]]
Multiple data records are appended to this packaged data; the size of the packaged record is limited to an upper bounded size of what the server computing device 20 said it can handle in the HELLO response, minus 10% for overhead, or 500 records, or how many records can be appended in 1.5 seconds. This 1.5 second limit is to keep the network connection open and flowing; too long between data commands and many network devices such as firewalls will force the connection closed to minimize resource usage.

In one embodiment, as part of each SSL HTTP record transaction, an MD5 checksum of the data record is included to check for communication errors; any corrupted data records are discarded.

The embodiment of the invention described in conjunction with FIGS. 13-23 has numerous advantageous features and benefits. First of all, this database synchronization system and method is database agnostic. That is, as long as the database schema and data formats are the same or compatible, then the record digest can be imported. Also, the database synchronization system and method is operating system agnostic. In other words, as long as the protocol is implemented properly, then the exchange will work regardless of the operating system. Also, this database synchronization system and method is network agnostic. That is, as long as standard SSL HTTP is not blocked, then the protocol will work both with an intra-office network and wide-area Internet access. Firewall support is transparent due to SSL HTTP. HTTP proxy support is also built-in. In addition, this database synchronization system and method is data format agnostic. Each table and record only requires two key fields: (i) a GUID record identifier and (ii) a modification data (e.g., a timestamp). The other field values are not used to determine if the record should be exchanged or not.

The database synchronization system and method explained in conjunction with FIGS. 13-23 is also resumable and restartable. The records to be exchanged with a peer are logged so that if the network or system is interrupted, the exchange can continue when the computing devices or systems next connect. Thus, at most, you would only skip one record during the two-way merge or synchronization process if it is interrupted. Advantageously, this embodiment of the database synchronization system and method also has low hardware requirements and low user-interface impact. In particular, the protocol scales based on hardware, and consumes very little disk space during normal operation. Also, with regard to the user-interface impact, the exchange takes place in the background, with records being exported and updated as the user works. Updated records that are key to the current user interface context are immediately updated to reflect current changes, as long as the user is not currently working with a related record.

In addition, the database synchronization system and method explained in conjunction with FIGS. 13-23 is extremely fast. The record exchange and import works at network speeds, and typically operates as fast as a standard network file copy. This database synchronization system and method also supports multiple computing stations. That is, the system can connect with and exchange records with multiple computing stations simultaneously, up to the limits of the hardware (disk drive, memory, network infrastructure). Advantageously, this database synchronization system and method additionally includes store-and-forward capabilities. That is, a system may be configured so that it caches all the record updates from other systems and forwards them at a later time to another system, acting as a buffer or gateway for an off-site storage system. This database synchronization system and method also incorporates sub-grouping of computing devices (e.g., sync group #1, sync group #2, sync group #3, etc.). As such, multiple computing devices or systems on the same intra-office network can be arranged into named groups, so that they only exchange records with their own group peers (e.g., if a particular computing device belongs to sync group #1, it can only exchange records with the other computing devices assigned to sync group #1, it cannot exchange records with the computing devices assigned to sync group #2).

In one or more embodiments, the database synchronization system and method explained in conjunction with FIGS. 13-23 generally operates in an asynchronous mode. That is, the computing device on each side of the two-way merge or synchronization process (e.g., the client computing device 10 and the server computing device 20) does not have to wait on the other for proceeding with at least one or more steps of two-way merge or synchronization process. As such, the two-way merge or synchronization process is generally an automatic process that occurs in the background, rather in the foreground of the computing system. In one or more embodiments, the data compression performed in conjunction with the two-way merge processes of FIGS. 13-23 is executed "on the fly". Advantageously, one or more embodiments of the two-way merge process are capable of maximizing network throughput, without slowing down the system (e.g., as facilitated by the 1.5 second data requirement described above). In one or more embodiments, the merge processes of FIGS. 13-23 are implemented on computing devices arranged in a star network topology. That is, the network comprises one central swtich, hub, or computer (e.g., server computing device 20), which acts as a data conduit to transmit messages. In other words, the star network comprises a central node, to which all other nodes are connected. This central node provides a common connection point for all nodes through a hub. In this star network topology, every node (i.e., computer workstation or any other type of peripheral device) is connected to a central node called the hub or switch. For example, the hub or switch is the server computing device 20 and the peripherals are client computing devices 14.

4. Example of a One-Way Merge Application

Figure 9:
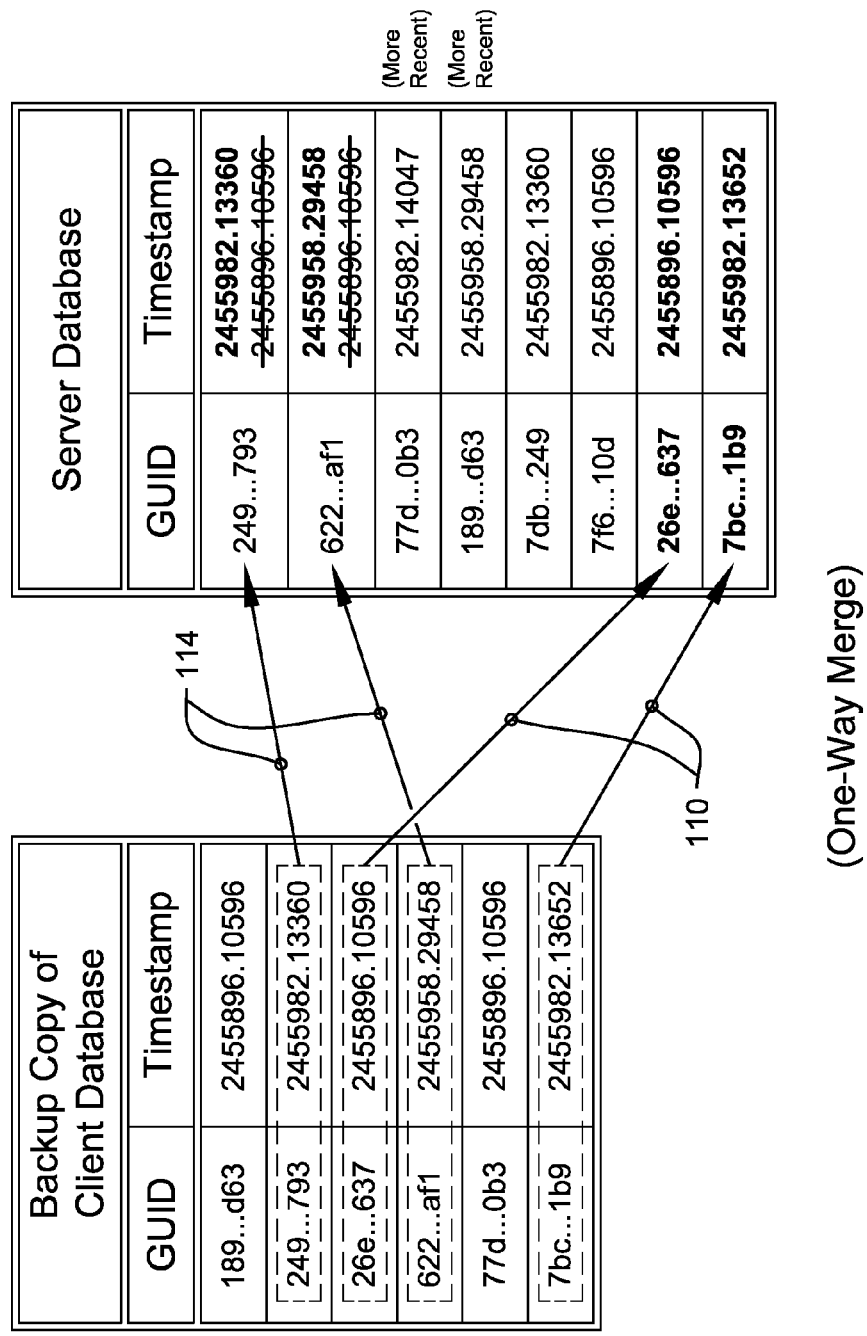
FIG. 9 illustrates an example of the one-way merge procedure for a sample list of records.

FIG. 9 illustrates an example of a one-way merge application carried out by an embodiment of the present invention. In order to facilitate the explanation of the merge processes described herein, the middle characters of the record GUID numbers have been omitted (as indicated by the use of the ellipses) to shorten the overall length of these numbers. However, it is to be understood that the actual GUID numbers used in the database merging system will have a total of 32 characters. Turning to this figure, it is initially determined that the first record in the client database, identified by GUID number "189 . . . d63", also appears in the server database (step 106 in FIG. 4). However, because it is further determined that the version of record number "189 . . . d63" in the backup copy of the client database was not updated more recently than the corresponding record in the server database (step 108 in FIG. 4), the record is not copied to the server database. The most recent version of record number "189 . . . d63" is determined by comparing the Julian date of the record in the client database to the Julian date of the associated record in the server database. In this case, the copy of record number "189 . . . d63" in the client database has a Julian date of "2455896.10596" (corresponding to Wednesday, Nov. 30, 2011 at 14:32:34.9 UT), whereas the copy of the record in the server database has a Julian date of "2455958.29458" (corresponding to Tuesday, Jan. 31, 2012 at 19:04:11.7 UT). Thus, the copy of the record in the server database is more recent than the copy of the record in the client database, so the record is not copied to the server database.

Next, turning to the second record in the client database, which is identified by GUID number "249 . . . 793", it is also determined that a copy of this record additionally appears in the server database (step 106 in FIG. 4). Thus, it is further determined if the backup copy of this record in the client database was updated more recently than the copy in the server database (step 108 in FIG. 4). Unlike the previous record, a comparison of the Julian dates associated with the two versions of record number "249 . . . 793" reveals that the version of the record in the backup copy of the client database was updated more recently (i.e., Julian date "2455982.13360" corresponds to Friday, Feb. 24, 2012 at 15:12:23.0 UT, while Julian date "2455896.10596" corresponds to Wednesday, Nov. 30, 2011 at 14:32:34.9 UT). Consequently, the server copies record number "249 . . . 793" from the backup copy of the client database to the server database (step 114 in FIG. 5), and overwrites the older version of record number "249 . . . 793" in the server database (as indicated by the line through the old timestamp "2455896.10596" in FIG. 9 and the addition of new timestamp "2455982.13360" thereabove).

The fourth record in the client database, which is denoted by GUID number "622 . . . af1" is treated in the same manner as record number "249 . . . 793" because the backup copy of the client database also contains a more recent version of this record (i.e., Julian date "2455958.29458" corresponds to Tuesday, Jan. 31, 2012 at 19:04:11.7 UT, while Julian date "2455896.10596" corresponds to Wednesday, Nov. 30, 2011 at 14:32:34.9 UT). Therefore, as described for record number "249 . . . 793", the server copies record number "622 . . . af1" from the backup copy of the client database to the server database (step 114 in FIG. 5), and overwrites the older version of record number "622 . . . af1" in the server database (as indicated by the line through the old timestamp "2455896.10596" in FIG. 9 and the addition of new timestamp "2455958.29458" thereabove).

Referring again to FIG. 9, it is determined that the third record in the client database, which is denoted by GUID number "26e . . . 637" does not exist at all in the server database (step 106 in FIG. 4). Consequently, the server copies record number "26e . . . 637" from the backup copy of the client database to the server database (step 110 in FIG. 4). Because the sixth record in the client database, namely record number "7bc . . . 1b9", also does not exist in the server database, the server additionally copies this record from the backup copy of the client database to the server database (step 110 in FIG. 4).

Like the first record described above, it is determined that the fifth record in the client database, which is identified by GUID number "77d . . . 0b3", also appears in the server database (step 106 in FIG. 4). As such, it is further determined if the backup copy of this record in the client database was updated more recently than the copy in the server database (step 108 in FIG. 4). In this case, a comparison of the Julian dates associated with the two versions of record number "77d . . . 0b3" reveals that the version of the record in the backup copy of the client database was not updated more recently than the version in the server database (i.e., Julian date "2455896.10596" in the client database corresponds to Wednesday, Nov. 30, 2011 at 14:32:34.9 UT, while Julian date "2455982.14047" in the server database corresponds to Friday, Feb. 24, 2012 at 15:22:16.6 UT). Therefore, as for the first record described above, the version of the record from the backup copy of the client database is not copied to the server database.

5. Example of a Two-Way Merge Application

Figure 10:
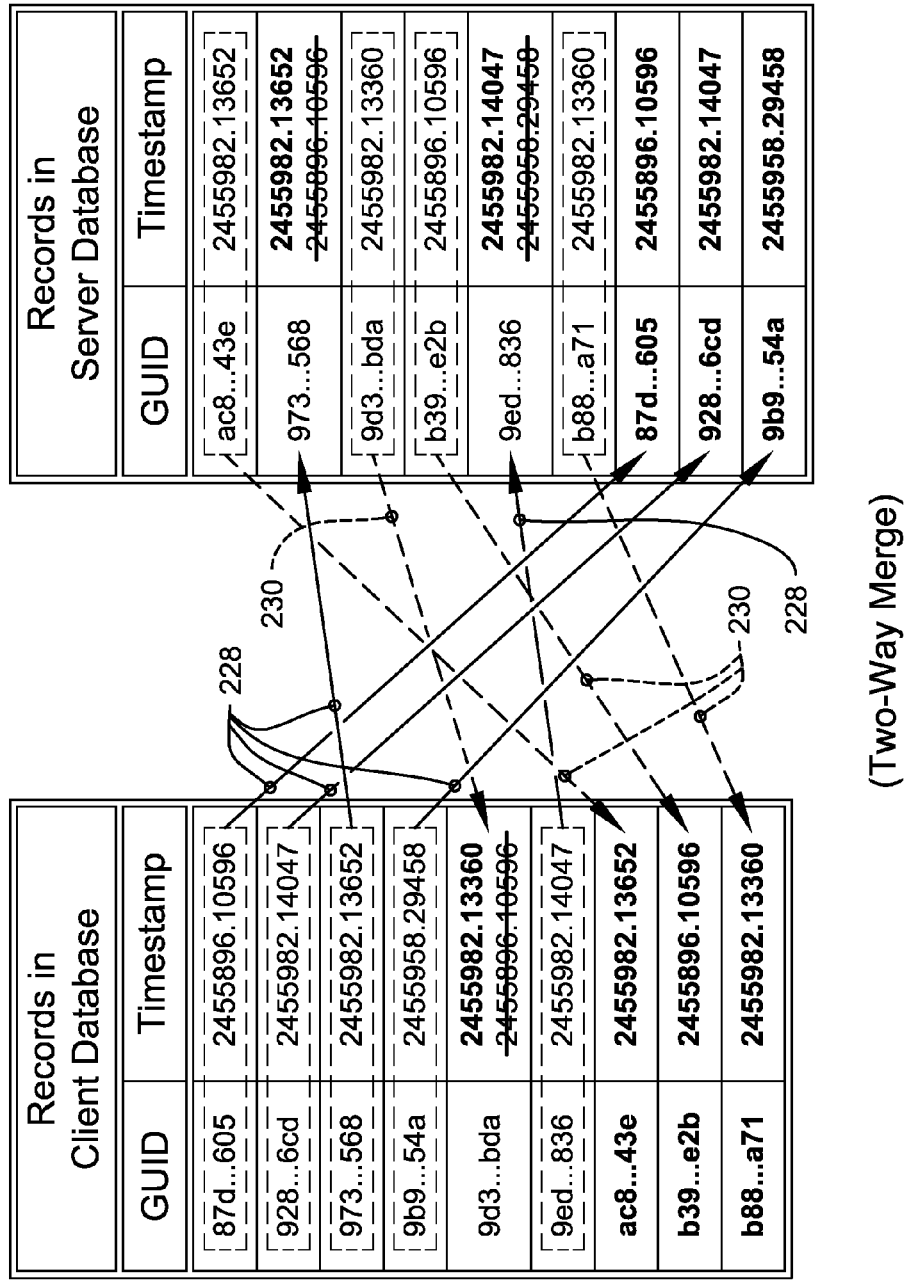
FIG. 10 illustrates an example of the two-way merge procedure for a sample list of records.

FIG. 10 illustrates an example of a two-way merge application carried out by an embodiment of the present invention. Turning to this figure, it is initially determined that the first record in the client database, identified by GUID number "87d . . . 605", does not exist at all in the server database (step 208 in FIG. 6). Consequently, the server adds record number "87d . . . 605" to a record request list (step 212 in FIG. 7), and record number "87d . . . 605" is subsequently exported by the client to the server (in step 228 of FIG. 8) after the client receives the record request list from the server. Because the second and fourth records in the client database, identified by GUID numbers "928 . . . 6cd" and "9b9 . . . 54a" respectively, also do not exist in the server database, the server additionally adds record numbers "928 . . . 6cd" and "9b9 . . . 54a" to the record request list (step 212 in FIG. 7). Then, like record number "87d . . . 605", record numbers "928 . . . 6cd" and "9b9 . . . 54a" are subsequently exported by the client to the server (in step 228 of FIG. 8) after the client receives the record request list from the server.

Next, turning to the third record in the client database, which is identified by GUID number "973 . . . 568", it is determined that a version of this record additionally appears in the server database (step 208 in FIG. 6). Thus, it is further determined if the version of this record in the client database was updated more recently than the version in the server database (step 210 in FIG. 7). The most recent version of record number "973 . . . 568" is determined by comparing the Julian date of the record in the client database to the Julian date of the associated record in the server database. In this case, the version of record number "973 . . . 568" in the client database has a Julian date of "2455982.13652" (corresponding to Friday, Feb. 24, 2012 at 15:16:35.3 UT), whereas the version of this record in the server database has a Julian date of "2455896.10596" (corresponding to Wednesday, Nov. 30, 2011 at 14:32:34.9 UT). Therefore, because the version of the record in the client database is more recent than the version of the record in the server database, the server adds record number "973 . . . 568" to the record request list (step 214 in FIG. 7), and it is subsequently exported by the client to the server (in step 228 of FIG. 8) after the client receives the record request list from the server. After which, the outdated version of the record number "973 . . . 568" on the server is overwritten with the new version of the record from the client database (as indicated by the line through the old timestamp "2455896.10596" in FIG. 10 and the addition of new timestamp "2455982.13652" thereabove). Like record number "973 . . . 568", a version of the sixth record in the client database, which is identified by GUID number "9ed . . . 836", also appears in the server database. As such, it is further determined if the version of this record in the client database was updated more recently than the version in the server database (step 210 in FIG. 7). Similar to record number "973 . . . 568", a comparison of the Julian dates associated with the two versions of record number "9ed . . . 836" reveals that the version of the record in the client database is more recent (i.e., Julian date "2455982.14047" in the client database corresponds to Friday, Feb. 24, 2012 at 15:22:16.6 UT, while Julian date "2455958.29458" in the server database corresponds to Tuesday, Jan. 31, 2012 at 19:04:11.7 UT, signifying that the version of the record in the client database is more recent). Thus, because the version of the record in the client database is more recent than the version of the record in the server database, the server adds record number "9ed . . . 836" to the record request list (step 214 in FIG. 7), and it is subsequently exported by the client to the server (in step 228 of FIG. 8) after the client receives the record request list from the server. The old version of the record number "9ed . . . 836" on the server is overwritten with the new version of the record from the client database (as indicated by the line through the old timestamp "2455958.29458" in FIG. 10 and the addition of new timestamp "2455982.14047" thereabove).

Now, turning to the fifth record in the client database, which is identified by GUID number "9d3 . . . bda", it is determined that a version of this record additionally appears in the server database (step 208 in FIG. 6). Thus, it is further determined if the version of this record in the client database was updated more recently than the version in the server database (step 210 in FIG. 7). In this case, the version of record number "9d3 . . . bda" in the client database has a Julian date of "2455896.10596" (corresponding to Wednesday, Nov. 30, 2011 at 14:32:34.9 UT), whereas the version of this record in the server database has a Julian date of "2455982.13360" (corresponding to Friday, Feb. 24, 2012 at 15:12:23.0 UT). Therefore, because the version of the record in the client database is not more recent than the version of the record in the server database, the server adds record number "9d3 . . . bda" to the record send list (step 216 in FIG. 7), and it is subsequently exported by the server to the client (in step 230 of FIG. 8). After which, the outdated version of the record number "9d3 . . . bda" on the client is overwritten with the new version of the record from the server database (as indicated by the line through the old timestamp "2455896.10596" in FIG. 10 and the addition of new timestamp "2455982.13360" thereabove).

Finally, turning to the server database in FIG. 10, it is initially determined that the first record in the server database, identified by GUID number "ac8 . . . 43e", does not exist at all in the client database (step 220 in FIG. 7). Consequently, the server adds record number "ac8 . . . 43e" to a record send list (step 224 in FIG. 8), and record number "ac8 . . . 43e" is subsequently exported by the server to the client (in step 230 of FIG. 8). Because the fourth and sixth records in the server database, identified by GUID numbers "b39 . . . e2b" and "b88 . . . a71" respectively, also do not exist in the client database, the server additionally adds record numbers "b39 . . . e2b" and "b88 . . . a71" to the record send list (step 224 in FIG. 8). Then, like record number "ac8 . . . 43e", record numbers "b39 . . . e2b" and "b88 . . . a71" are subsequently exported by the server to the client (in step 230 of FIG. 8).

Advantageously, the system and method for the merging of databases described herein is not concerned with the inherent clock drift that is experienced by computing devices. Considering that virtually all modern computing systems automatically synchronize their own clocks, any residual clock drift after synchronization will be so miniscule in nature that it will have no appreciable effect on the merging of the database records explained hereinbefore. Thus, the present invention can be employed on computing systems which use standard methods to automatically synchronize their clocks. Moreover, some of the embodiments of the system and method for the merging of databases described herein do not require the use of a transaction, activity, or history log in a separate file, which would undesirably add to the overall complexity of the merging procedure. Also, because the system and method for the merging of databases disclosed herein is not concerned with determining the changed content of records, it does not determine or evaluate the modification status of any records. Furthermore, at least some of the embodiments of the system and method for the merging of databases hereinbefore explained do not rely upon any centralized database, nor do these embodiments employ any type of scripting or business logic. Some embodiments of the system and method for the merging of databases described herein operate in a synchronous mode, and utilize single peer-to-peer communication without the need for any type of master server device. Also, in these embodiments, while the merge processes are being carried out, the updating of the data in the client database 18 and the server database 28 is not permitted. As described above, other embodiments of the system and method for the merging of databases explained herein operate in an asynchronous mode, wherein the computing device on each side on the merge process (e.g., the client computing device 10 and the server computing device 20) does not have to wait on the other for proceeding with at least one or more steps the merge process.

In addition, some embodiments of the aforedescribed system and method for the merging of databases provide a great deal of flexibility in the connectivity of the computer system, wherein individual computers in the system can be connected on an ad hoc basis to merge the database results when needed, with no requirements for the availability of a continual network connection. Also, in at least some embodiments of the invention, records are never deleted from the client computing device 10 or the server computing device 20. Rather, the records are merely marked as deleted when they are overwritten, and thus can be undeleted if necessary.

Although the invention has been shown and described with respect to a certain embodiment or embodiments, it is apparent that this invention can be embodied in many different forms and that many other modifications and variations are possible without departing from the spirit and scope of this invention. Moreover, while reference is made throughout this disclosure to, for example, "an illustrative embodiment", "one embodiment", "this embodiment", or a "further embodiment", it is to be understood that some or all aspects of these various embodiments may be combined with another as part of an overall embodiment of the invention.

In addition, while exemplary embodiments have been described herein, one of ordinary skill in the art will readily appreciate that the exemplary embodiments set forth above are merely illustrative in nature and should not be construed as to limit the claims in any manner. Rather, the scope of the invention is defined only by the appended claims and their equivalents, and not, by the preceding description.

The invention claimed is:

1. A system for merging two databases with one another, the system comprising:
    first, second, and third computing devices having respective first, second, and third databases stored thereon, the first, second, and third databases each comprising one or more records, each of the one or more records having a unique identifier and timestamp associated therewith, the first, second, and third computing devices being operatively connected to one another by a network connection in a peer-to-peer manner without using a central master server, each of the first, second, and third computing devices being peers with respect to one another such that syncing occurs between the first computing device and the second computing device, syncing occurs between the first computing device and the third computing device, and syncing occurs between the second computing device and the third computing device;
    the first computing device being specially programmed to:
        prior to determining whether it is already syncing with the second computing device, send an initial command to the second computing device;
        when the second computing device responds to the initial command sent by the first computing device, receive at least the following: (i) a unique identifier of the second computing device, (ii) a maximum data block size that the second computing device is capable of receiving as one payload, and (iii) a last time the second computing device communicated with the first computing device;
        determine whether it is already syncing with the second computing device;
        when it is determined that the first computing device is already syncing with the second computing device, communications between the first computing device and the second computing device are ended;
        when it is determined that the first computing device is not already syncing with the second computing device, generate a first filtered listing of the one or more unique identifiers and timestamps associated with the one or more records in the first database by using a timestamp filter, the timestamp filter comprising a first last-seen timestamp value which is indicative of the last time the first computing device communicated with the second computing device, the first last-seen timestamp value being specific to communications between the first computing device and the second computing device, wherein records having timestamps older than the first last-seen timestamp value are not included in the first filtered listing, the timestamp filter further comprising a second last-seen timestamp value that is specific to communications between the first computing device and the third computing device;
        send the first filtered listing of one or more unique identifiers and timestamps from the first computing device to the second computing device;
    the second computing device being specially programmed to:
        generate a second filtered listing of one or more unique identifiers and timestamps associated with the one or more records in the second database using the first last-seen timestamp value sent to the second computing device from the first computing device;
        compare the first filtered listing of the one or more unique identifiers and timestamps associated with the one or more records in the first database to the second filtered listing of one or more unique identifiers and timestamps associated with the one or more records in the second database;
        determine whether each of the one or more unique identifiers in the first filtered listing exists in the second filtered listing, and whether each of the one or more unique identifiers in the second filtered listing exists in the first filtered listing;
        when it is determined that one or more unique identifiers in the first filtered listing do not exist in the second filtered listing, add one or more records associated with the one or more unique identifiers that do not exist to a record request list;
        when it is determined that one or more unique identifiers in the first filtered listing also exist in the second filtered listing, further determine, a most recent version of one or more records associated with the one or more unique identifiers existing in both listings by comparing one or more timestamps in the first filtered listing to one or more timestamps of one or more corresponding records in the second filtered listing;
        when it is determined that one or more records in the first filtered listing have a more recent timestamp than one or more corresponding records in the second filtered listing with matching unique identifiers, adding the one or more records having more recent timestamps to the record request list;

when it is determined that one or more records in the second filtered listing have a more recent timestamp than one or more corresponding records in the first filtered listing with matching unique identifiers, add the one or more records having more recent timestamps to a record send list;

when it is determined that one or more unique identifiers in the second filtered listing do not exist in the first filtered listing, add one or more records associated with the one or more unique identifiers that do not exist to the record send list;

transfer the record request list to the first computing device;

copy the one or more records on the record send list into a second export queue of the second computing device; and the first computing device being further specially programmed to:

copy the one or more records on the record request list into a first export queue of the first computing device.

2. The system according to claim 1, wherein the first computing device is further specially programmed to:

after sending the initial command to the second computing device, determine whether the second computing device responds to the initial command within a predetermined timeframe.

3. The system according to claim 1, wherein at least one of the first and second last-seen timestamp values of the timestamp filter is expressed in the form of a Julian date.

4. The system according to claim 1, wherein the first computing device is a client computing device and the second computing device is a server computing device.

5. A method for merging two databases with one another, the method comprising the steps of:

providing first, second, and third computing devices having respective first, second, and third databases stored thereon, the first, second, and third databases each comprising one or more records, each of the one or more records having a unique identifier and timestamp associated therewith;

connecting each of the first, second, and third computing devices to one another by utilizing a network connection in a peer-to-peer manner without using a central master server, each of the first, second, and third computing devices being peers with respect to one another such that syncing occurs between the first computing device and the second computing device, syncing occurs between the first computing device and the third computing device, and syncing occurs between the second computing device and the third computing device;

prior to determining whether the first computing device is already syncing with the second computing device, sending an initial command to the second computing device using the first computing device;

when the second computing device responds to the initial command sent by the first computing device, receiving at least the following information at the first computing device: (i) a unique identifier of the second computing device, (ii) a maximum data block size that the second computing device is capable of receiving as one payload, and (iii) a last time the second computing device communicated with the first computing device;

determining, by using the first computing device, whether the first computing device is already syncing with the second computing device;

when it is determined that the first computing device is already syncing with the second computing device, ending communications between the first computing device and the second computing device;

when it is determined that the first computing device is not already syncing with the second computing device, generating, by using the first computing device, a first filtered listing of the one or more unique identifiers and timestamps associated with the one or more records in the first database by using a timestamp filter, the timestamp filter comprising a first last-seen timestamp value which is indicative of the last time the first computing device communicated with the second computing device, the first last-seen timestamp value being specific to communications between the first computing device and the second computing device, wherein records having timestamps older than the first last-seen timestamp value are not included in the first filtered listing, the timestamp filter further comprising a second last-seen timestamp value that is specific to communications between the first computing device and the third computing device;

sending the first filtered listing of one or more unique identifiers and timestamps from the first computing device to the second computing device;

comparing, by using the second computing device, the first filtered listing of the one or more unique identifiers and timestamps associated with the one or more records in the first database to a second filtered listing of one or more unique identifiers and timestamps associated with the one or more records in the second database, the second filtered listing being generated using the first last-seen timestamp value sent to the second computing device from the first computing device;

determining, by using the second computing device, whether each of the one or more unique identifiers in the first filtered listing exists in the second filtered listing, and whether each of the one or more unique identifiers in the second filtered listing exists in the first filtered listing;

when it is determined that one or more unique identifiers in the first filtered listing do not exist in the second filtered listing, adding one or more records associated with the one or more unique identifiers that do not exist to a record request list;

when it is determined that one or more unique identifiers in the first filtered listing also exist in the second filtered listing, further determining, by using the second computing device, a most recent version of one or more records associated with the one or more unique identifiers existing in both listings by comparing one or more timestamps in the first filtered listing to one or more timestamps of one or more corresponding records in the second filtered listing;

when it is determined that one or more records in the first filtered listing have a more recent timestamp than one or more corresponding records in the second filtered listing with matching unique identifiers, adding the one or more records having more recent timestamps to the record request list;

when it is determined that one or more records in the second filtered listing have a more recent timestamp than one or more corresponding records in the first filtered listing with matching unique identifiers, adding the one or more records having more recent timestamps to a record send list;

when it is determined that one or more unique identifiers in the second filtered listing do not exist in the first filtered listing, adding one or more records associated with the one or more unique identifiers that do not exist to the record send list;

transferring the record request list from the second computing device to the first computing device;

copying, using the second computing device, the one or more records on the record send list into a second export queue of the second computing device; and copying, using the first computing device, the one or more records on the record request list into a first export queue of the first computing device.

6. The method according to claim 5, further comprising the steps of:

exporting the one or more records in the first export queue from the first computing device to the second computing device; and exporting the one or more records in the second export queue from the second computing device to the first computing device.

7. The method according to claim 6, further comprising the steps of:

after each of the one or more records in the first export queue is sent from the first computing device to the second computing device, determining, by using the second computing device, whether each of the one or more records sent from the first computing device exists in the second database by comparing one or more unique identifiers of the one or more records sent from the first computing device to one or more unique identifiers of the one or more records in the second database;

when it is determined that one or more records sent from the first computing device do not exist in the second database, insert the one or more records associated with the one or more unique identifiers that do not exist into the second database;

when it is determined that the one or more records sent from the first computing device also exist in the second database, further determine a most recent version of the one or more records also existing in the second database by comparing one or more timestamps of the one or more records sent from the first computing device to one or more timestamps of one or more corresponding records in the second database; and when it is determined that the one or more records sent from the first computing device have a more recent timestamp than one or more corresponding records in the second database with matching unique identifiers, update the one or more corresponding records in the second database.

8. The method according to claim 6, further comprising the steps of:

after each of the one or more records in the second export queue is sent from the second computing device to the first computing device, determining, by using the first computing device, whether each of the one or more records sent from the second computing device exists in the first database by comparing one or more unique identifiers of the one or more records sent from the second computing device to one or more unique identifiers of the one or more records in the first database;

when it is determined that one or more records sent from the second computing device do not exist in the first database, insert the one or more records associated with the one or more unique identifiers that do not exist into the first database;

when it is determined that the one or more records sent from the second computing device also exist in the first database, further determine a most recent version of the one or more records also existing in the first database by comparing one or more timestamps of the one or more records sent from the second computing device to one or more timestamps of one or more corresponding records in the first database; and when it is determined that the one or more records sent from the second computing device have a more recent timestamp than one or more corresponding records in the first database with matching unique identifiers, update the one or more corresponding records in the first database.

9. The method according to claim 5, further comprising the step of:

when the first computing device has never previously communicated with the second computing device, setting the first last-seen timestamp value equal to zero by using the first computing device.

10. The method according to claim 5, wherein the first computing device is a client computing device and the second computing device is a server computing device.

11. The method according to claim 5, wherein the method for merging two databases with one another is an asynchronous process that is capable of operating on the first and second computing devices while other applications are being simultaneously executed by the first and second computing devices.

12. The method according to claim 5, wherein the method for merging two databases with one another is a resumable process that is capable of being restarted at any point in the process if an interruption in the network connection between the first and second computing devices occurs.

13. A system for merging two databases with one another, the system comprising:

first, second, and third computing devices having respective first, second, and third databases stored thereon, the first, second, and third databases each comprising one or more records, each of the one or more records having a unique identifier and timestamp associated therewith, the first, second, and third computing devices being operatively connected to one another by a network connection in a peer-to-peer manner without using a central master server, each of the first, second, and third computing devices being peers with respect to one another;

the first computing device being specially programmed to:

perform a user datagram protocol process in order to determine a sync group list of networked computing devices that are capable of being synced with the first computing device by broadcasting a data packet that at least includes a sync group name and a database schema to the second and third computing devices;

receive a response from the second and third computing devices during the user datagram protocol process, and add the second and third computing devices to the sync group list so that the first computing device is capable of syncing with the second computing device, and the first computing device is capable of syncing with the third computing device;

determine whether the first computing device is already syncing with the second computing device;

when it is determined that the first computing device is already syncing with the second computing device, communications between the first computing device and the second computing device are ended;

when it is determined that the first computing device is not already syncing with the second computing device, generate a first filtered listing of the one or more unique identifiers and timestamps associated with the one or more records in the first database by using a timestamp filter, the timestamp filter comprising a first last-seen timestamp value which is indicative of the last time the first computing device communicated with the second computing device, the first last-seen timestamp value being specific to communications between the first computing device and the second computing device, wherein records having timestamps older than the first last-seen timestamp value are not included in the first filtered listing, the timestamp filter further comprising a second last-seen timestamp value that is specific to communications between the first computing device and the third computing device;

send the first filtered listing of one or more unique identifiers and timestamps from the first computing device to the second computing device;

the second computing device being specially programmed to:

generate a second filtered listing of one or more unique identifiers and timestamps associated with the one or more records in the second database using the first last-seen timestamp value sent to the second computing device from the first computing device;

compare the first filtered listing of the one or more unique identifiers and timestamps associated with the one or more records in the first database to the second filtered listing of one or more unique identifiers and timestamps associated with the one or more records in the second database;

determine whether each of the one or more unique identifiers in the first filtered listing exists in the second filtered listing, and whether each of the one or more unique identifiers in the second filtered listing exists in the first filtered listing;

when it is determined that one or more unique identifiers in the first filtered listing do not exist in the second filtered listing, add one or more records associated with the one or more unique identifiers that do not exist to a record request list;

when it is determined that one or more unique identifiers in the first filtered listing also exist in the second filtered listing, further determine, a most recent version of one or more records associated with the one or more unique identifiers existing in both listings by comparing one or more timestamps in the first filtered listing to one or more timestamps of one or more corresponding records in the second filtered listing;

when it is determined that one or more records in the first filtered listing have a more recent timestamp than one or more corresponding records in the second filtered listing with matching unique identifiers, adding the one or more records having more recent timestamps to the record request list;

when it is determined that one or more records in the second filtered listing have a more recent timestamp than one or more corresponding records in the first filtered listing with matching unique identifiers, add the one or more records having more recent timestamps to a record send list;

when it is determined that one or more unique identifiers in the second filtered listing do not exist in the first filtered listing, add one or more records associated with the one or more unique identifiers that do not exist to the record send list;

transfer the record request list to the first computing device;

copy the one or more records on the record send list into a second export queue of the second computing device; and the first computing device being further specially programmed to:

copy the one or more records on the record request list into a first export queue of the first computing device.

14. The system according to claim 13, wherein the first computing device is further specially programmed to export the one or more records in the first export queue to the second computing device; and wherein the second computing device is further specially programmed to export the one or more records in the second export queue to the first computing device.

15. The system according to claim 13, wherein the first computing device is further specially programmed to:

prior to determining whether it is already syncing with the second computing device, send an initial command to the second computing device; and when the second computing device responds to the initial command sent by the first computing device, receive at least the following: (i) a unique identifier of the second computing device, (ii) a maximum data block size that the second computing device is capable of receiving as one payload, and (iii) a last time the second computing device communicated with the first computing device.

16. The system according to claim 15, wherein the first computing device is further specially programmed to:

after sending the initial command to the second computing device, determine whether the second computing device responds to the initial command within a predetermined timeframe.

17. The system according to claim 13, wherein, when the first computing device has never previously communicated with the second computing device, the first computing device is further specially programmed to:

set the first last-seen timestamp value equal to zero.

* * * * *